(12) United States Patent
Sugimoto

(10) Patent No.: US 8,913,158 B2
(45) Date of Patent: Dec. 16, 2014

(54) SHOOTING DEVICE AND PROGRAM

(71) Applicant: FUJIFILM Corporation, Tokyo (JP)

(72) Inventor: Masahiko Sugimoto, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/092,419

(22) Filed: Nov. 27, 2013

(65) Prior Publication Data

US 2014/0132801 A1 May 15, 2014

Related U.S. Application Data

(63) Continuation of application No. PCT/JP2012/060998, filed on Apr. 24, 2012.

(30) Foreign Application Priority Data

May 31, 2011 (JP) .................................. 2011-122119

(51) Int. Cl.
| | | |
|---|---|---|
| *H04N 5/76* | (2006.01) | |
| *H04N 1/21* | (2006.01) | |
| *H04N 5/232* | (2006.01) | |
| *H04N 9/82* | (2006.01) | |
| *H04N 1/00* | (2006.01) | |
| *H04N 101/00* | (2006.01) | |
| *H04N 21/422* | (2011.01) | |
| *H04N 21/4223* | (2011.01) | |
| *H04N 21/433* | (2011.01) | |
| *H04N 21/6547* | (2011.01) | |
| *H04N 21/658* | (2011.01) | |

(52) U.S. Cl.
CPC ......... *H04N 1/2125* (2013.01); *H04N 5/23222* (2013.01); *H04N 9/8205* (2013.01); *H04N 1/00323* (2013.01); *H04N 2101/00* (2013.01); *H04N 21/42202* (2013.01); *H04N 21/4223* (2013.01); *H04N 21/4334* (2013.01); *H04N 21/6547* (2013.01); *H04N 21/6581* (2013.01)
USPC ........................................................ 348/231.6

(58) Field of Classification Search
USPC ......... 348/135, 207.99, 208.16, 222.1, 231.5, 348/231.6, 333.01, 333.02, 333.04, 364
See application file for complete search history.

(56) References Cited

U.S. PATENT DOCUMENTS 6,301,440 B1 * 10/2001 Bolle et al. .................... 396/128
7,970,268 B2 * 6/2011 Kasai et al. ..................... 396/57

(Continued)

FOREIGN PATENT DOCUMENTS

| JP | 2007-228118 | * | 9/2007 |
|---|---|---|---|
| JP | 2007-228118 A | | 9/2007 |

(Continued)

OTHER PUBLICATIONS

International Preliminary Report on Patentability of PCT/JP2012/060998 dated Dec. 18, 2012.

*Primary Examiner* — Lin Ye
*Assistant Examiner* — Chriss Yoder, III
(74) *Attorney, Agent, or Firm* — Birch, Stewart, Kolasch & Birch, LLP

(57) ABSTRACT

The present invention provides a shooting device and a program that can recognize shooting scenes according to the situation with a high degree of precision. In at least one of a case where GPS information has not been acquired by a GPS receiver 58 within a predetermined period after the GPS receiver 58 has been activated, a case where the GPS information has been acquired by the GPS receiver 58 within the predetermined period after the GPS receiver 58 has been activated but the acquired GPS information has not been stored in a database C, and a case where a subject image has been acquired by shooting without the GPS receiver 58 being activated, the shooting device recognizes the shooting scene at the current shooting location on the basis of at least one of the subject image acquired by the shooting and shooting support information.

20 Claims, 13 Drawing Sheets

(56) References Cited

U.S. PATENT DOCUMENTS

| | | | | |
|---|---|---|---|---|
| 2007/0153111 | A1* | 7/2007 | Kato | 348/333.11 |
| 2008/0158391 | A1* | 7/2008 | Suzuki | 348/231.99 |
| 2009/0059054 | A1 | 3/2009 | Oishi et al. | |

FOREIGN PATENT DOCUMENTS

| | | | |
|---|---|---|---|
| JP | 2007-258927 | * | 10/2007 |
| JP | 2007-258927 A | | 10/2007 |
| JP | 2007-306461 | * | 11/2007 |
| JP | 2007-306461 A | | 11/2007 |
| JP | 2008-177780 | * | 7/2008 |
| JP | 2008-177780 A | | 7/2008 |
| JP | 2009-60195 | * | 3/2009 |
| JP | 2009-60195 A | | 3/2009 |
| JP | 2009-77157 | * | 4/2009 |
| JP | 2009-77157 A | | 4/2009 |
| JP | 2010-45436 | * | 2/2010 |
| JP | 2010-45436 A | | 2/2010 |

* cited by examiner

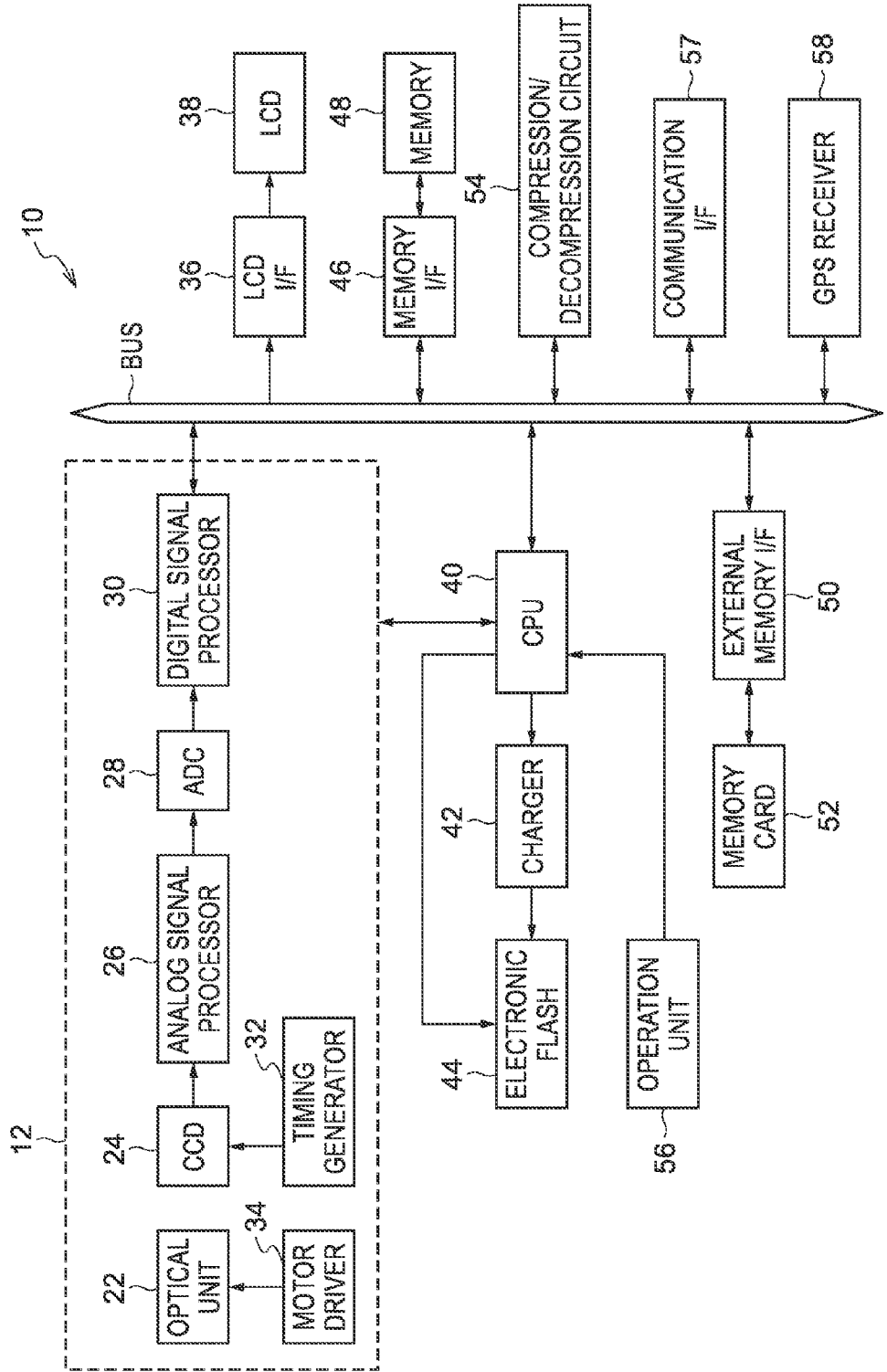

| FIRST SHOOTING SCENE CANDIDATE | COLOR | OCCUPATION PERCENTAGE | OBJECT |
|---|---|---|---|
| NIGHT SCENE | BLUE / BLACK | 30% / 60% | OUTDOOR LAMP |
| BLUE SKY | BLUE / NAVY BLUE | 60% / 30% | SUN |
| EVENING GLOW | ORANGE / YELLOW | 50% / 30% | SUN |
| BEACH | WHITE / BLUE | 30% / 40% | SANDY AREA |
| SNOW | WHITE / BROWN | 80% / 10% | SNOW |
| MACRO | RED / WHITE | 30% / 30% | - |
| LANDSCAPE | BLUE / GREEN | 30% / 30% | GREEN AREA |
| PERSON | YELLOW / WHITE | 20% / 20% | FACE |
| AUTO | BLUE / BLACK | 20% / 10% | - |

B — 48

| FIRST SHOOTING SCENE CANDIDATE | COLOR | OCCUPATION PERCENTAGE | OBJECT |
|---|---|---|---|
| NIGHT SCENE | BLUE / BLACK | 30% / 60% | OUTDOOR LAMP |
| BLUE SKY | BLUE / NAVY BLUE | 60% / 30% | SUN |
| EVENING GLOW | ORANGE / YELLOW | 50% / 30% | SUN |
| MACRO | RED / GREEN | 30% / 30% | - |
| LANDSCAPE | BLUE / GREEN | 30% / 30% | GREEN AREA |
| PERSON | YELLOW / WHITE | 20% / 20% | FACE |
| AUTO | BLUE / BLACK | 20% / 10% | - |

FIG.3

| SECOND SHOOTING SCENE CANDIDATE | DEGREE OF RELIABILITY (%) | LATITUDE / LONGITUDE / ELEVATION (POSITION INFORMATION ITEMS) | TIME FRAME |
|---|---|---|---|
| NIGHT SCENE | 60% | 35.584/138.342/147 | 18:00 - 6:00 |
|  | 70% | 34.744/135.299/200 | 18:00 - 6:00 |
|  | ⋮ | ⋮ | ⋮ |
| BLUE SKY | 30% | 35.543/140.163/14 | 6:00 - 15:00 |
|  | 25% | 34.741/138.409/8 | 6:00 - 15:00 |
|  | ⋮ | ⋮ | ⋮ |
| EVENING GLOW | 30% | 34.996/135.777/57 | 15:00 - 18:00 |
|  | 25% | 35.163/135.074/237 | 15:00 - 18:00 |
|  | ⋮ | ⋮ | ⋮ |
| BEACH | 30% | 36.362/136.409/1 | 6:00 - 15:00 |
|  | 25% | 34.951/139.106/1 | 6:00 - 15:00 |
|  | ⋮ | ⋮ | ⋮ |
| SNOW | 30% | 37.073/138.271/300 | 6:00 - 15:00 |
|  | 80% | 36.941/138.158/901 | 6:00 - 15:00 |
|  | ⋮ | ⋮ | ⋮ |
| MACRO | 30% | 35.451/139.631/11 | 6:00 - 15:00 |
|  | 25% | 35.779/139.168/15 | 6:00 - 15:00 |
|  | ⋮ | ⋮ | ⋮ |
| LANDSCAPE | 30% | 35.482/137.505/349 | 6:00 - 15:00 |
|  | 25% | 34.741/138.409/8 | 6:00 - 15:00 |
|  | ⋮ | ⋮ | ⋮ |
| PERSON | 30% | 35.543/140.163/14 | 6:00 - 15:00 |
|  | 25% | 35.422/136.766/92 | 6:00 - 15:00 |
|  | ⋮ | ⋮ | ⋮ |
| AUTO | 30% | 36.560/136.675/104 | 6:00 - 15:00 |
|  | 25% | 35.741/139.409/117 | 6:00 - 15:00 |
|  | ⋮ | ⋮ | ⋮ |

FIG.15

| SECOND SHOOTING SCENE CANDIDATE | DEGREE OF RELIABILITY (%) | DEGREE OF SIMILARITY (%) | LATITUDE / LONGITUDE / ELEVATION (POSITION INFORMATION ITEMS) | TIME FRAME |
|---|---|---|---|---|
| NIGHT SCENE | 60% | 70% | 35.584/138.342/147 | 18:00 - 6:00 |
|  | 70% | 80% | 34.744/135.299/200 | 18:00 - 6:00 |
|  | ⋮ | ⋮ | ⋮ | ⋮ |
| BLUE SKY | 30% | 80% | 35.543/140.163/14 | 6:00 - 15:00 |
|  | 25% | 80% | 34.741/138.409/8 | 6:00 - 15:00 |
|  | ⋮ | ⋮ | ⋮ | ⋮ |
| EVENING GLOW | 30% | 70% | 34.996/135.777/57 | 15:00 - 18:00 |
|  | 25% | 80% | 35.163/135.074/237 | 15:00 - 18:00 |
|  | ⋮ | ⋮ | ⋮ | ⋮ |
| BEACH | 30% | 30% | 36.362/136.409/1 | 6:00 - 15:00 |
|  | 25% | 20% | 34.951/139.106/1 | 6:00 - 15:00 |
|  | ⋮ | ⋮ | ⋮ | ⋮ |
| SNOW | 30% | 30% | 37.073/138.271/300 | 6:00 - 15:00 |
|  | 80% | 20% | 36.941/138.158/901 | 6:00 - 15:00 |
|  | ⋮ | ⋮ | ⋮ | ⋮ |
| MACRO | 30% | 10% | 35.451/139.631/11 | 6:00 - 15:00 |
|  | 25% | 20% | 35.779/139.168/15 | 6:00 - 15:00 |
|  | ⋮ | ⋮ | ⋮ | ⋮ |
| LANDSCAPE | 30% | 40% | 35.482/137.505/349 | 6:00 - 15:00 |
|  | 25% | 30% | 34.741/138.409/8 | 6:00 - 15:00 |
|  | ⋮ | ⋮ | ⋮ | ⋮ |
| PERSON | 30% | 5% | 35.543/140.163/14 | 6:00 - 15:00 |
|  | 25% | 3% | 35.422/136.766/92 | 6:00 - 15:00 |
|  | ⋮ | ⋮ | ⋮ | ⋮ |
| AUTO | 30% | 7% | 36.560/136.675/104 | 6:00 - 15:00 |
|  | 25% | 15% | 35.741/139.409/117 | 6:00 - 15:00 |
|  | ⋮ | ⋮ | ⋮ | ⋮ |

US 8,913,158 B2

SHOOTING DEVICE AND PROGRAM

CROSS REFERENCE TO RELATED APPLICATIONS

This application is a Continuation of PCT International Application No. PCT/JP2012/060998 filed on Apr. 24, 2012, which claims priority under 35 U.S.C. 119(a) to Application No. 2011-122119 filed in Japan on May 31, 2011, all of which are hereby expressly incorporated by reference into the present application.

BACKGROUND OF THE INVENTION

1. Field of the Invention

The present invention relates to a shooting device and a program that have the function of recognizing shooting scenes.

2. Description of the Related Art

In recent years, the demand for information devices having a shooting function, such as digital electronic still cameras, digital video cameras, mobile telephones, personal digital assistants (PDA; which are portable information terminals), has been rapidly increasing in accompaniment with increases in the resolution of solid-state image sensors such as charge-coupled device (CCD) area sensors and complementary metal-oxide-semiconductor (CMOS) image sensors. Information devices having a shooting function such as the ones above will be called shooting devices.

Incidentally, this type of shooting device has the function of recognizing the shooting scene suited to the current situation at the shooting location and performing shooting using a shooting condition uniquely determined with respect to the recognized shooting scene. In this case, recognizing the shooting scene with a good degree of precision becomes an important factor for performing shooting suited to the current situation. As technologies that recognize shooting scenes, the technologies described in Japanese Patent Application Laid-Open (JP-A) No. 2007-228118 and JP-A No. 2007-306461 are known.

JP-A No. 2007-228118 discloses a technology that recognizes the shooting scene according to the current situation at the shooting location from plural shooting scenes on the basis of subject information acquired by a subject information acquisition unit and the current position and the current time acquired by GPS.

Further, JP-A No. 2007-306461 discloses a technology that determines whether the current position acquired by GPS belongs to any of categories of predetermined plural shooting places (e.g., "mountains", "flatland", "seashore", "urban area") and recognizes the shooting scene according to the current situation at the shooting location in accordance with the determined category.

SUMMARY

However, the technology described in JP-A No. 2007-228118 is a technology predicated on the use of GPS, so recognizing the shooting scene with a good degree of precision becomes difficult in a case where the technology has for some reason become unable to acquire information using GPS.

Further, the technology described in JP-A No. 2007-306461 is a technology that recognizes the shooting scene in accordance with the category to which the current position acquired by GPS belongs, but it is unclear how the technology selects the category from the current position acquired by GPS. Even if the technology can select categories with some kind of means from the current position acquired by GPS, the categories are catch-all categories and are not categories unique to the shooting location. It must be said that it is difficult to trust shooting scenes recognized on the basis of such categories.

In this way, the technologies described in JP-A No. 2007-228118 and JP-A No. 2007-306461 have had the problem that it is difficult for them to recognize shooting scenes according to the situation with a good degree of precision.

The present invention has been made in order to solve the above problem, and it is an object thereof to provide a shooting device and a program that can recognize shooting scenes according to the situation with a high degree of precision.

In order to achieve the above object, a shooting device of a first aspect of the present invention is configured to include: shooting means that shoots a subject to thereby acquire a subject image; acquiring means which, in a case where it has been activated, utilizes GPS to acquire GPS information identifying the position of the shooting location; activating means that activates the acquiring means in a case where a predetermined condition has been met; storing means in which position information items representing geographical positions identifiable by the GPS information and shooting scene information items representing shooting scenes at the positions represented by the position information items are intercorrelated and stored beforehand; and scene recognizing means which, in a case where the GPS information acquired by the acquiring means activated by the activating means corresponds to a position information item stored in the storing means, recognizes the shooting scene at the current shooting location on the basis of the shooting scene information item correlated with that position information item and at least one of the subject image acquired by the shooting means and shooting support information that is acquired prior to shooting for acquiring the subject image and supports that shooting, wherein in the case where the GPS information acquired by the acquiring means activated by the activating means corresponds to a position information item stored in the storing means, the scene recognizing means selects, from plural shooting scene candidate information items representing predetermined plural shooting scene candidates, shooting scene candidate information items to which at least one of the subject image acquired by the shooting means and the shooting support information is similar with a degree of similarity equal to or greater than a predetermined degree of similarity, and among the selected shooting scene candidate information items, the scene recognizing means recognizes, as the shooting scene at the current shooting location, the shooting scene candidate represented by the shooting scene candidate information item corresponding to the shooting scene information item among the shooting scene information items stored in the storing means that is correlated with the position information item corresponding to the GPS information acquired by the acquiring means.

Further, a shooting device of a second aspect of the present invention is the shooting device of the first aspect of the present invention, wherein in at least one of a case where the activating means has not been activated, a case where the GPS information has not been acquired by the acquiring means even though the acquiring means has been activated by the activating means, and a case where a position information item corresponding to the GPS information acquired by the acquiring means activated by the activating means is not stored in the storing means, the scene recognizing means recognizes the shooting scene at the current shooting location on the basis of at least one of the subject image acquired by the shooting means and the shooting support information.

Further, a shooting device of a third aspect of the present invention is the shooting device of the first or second aspect of the present invention, wherein the storing means stores a shooting scene information item group having a plurality of the shooting scene information items, and in the case where the GPS information acquired by the acquiring means activated by the activating means corresponds to a position information item in the storing means, the scene recognizing means uses the plural shooting scene candidate information items as information items corresponding to the plural shooting scene information items that the shooting scene information item group has, the scene recognizing means selects, from the plural shooting scene candidate information items, shooting scene information items to which at least one of the subject image acquired by the shooting means and the shooting support information is similar with a degree of similarity equal to or greater than the predetermined degree of similarity, and among the selected shooting scene candidate information items, the scene recognizing means recognizes, as the shooting scene at the current shooting location, the shooting scene candidate represented by the shooting scene candidate information item corresponding to the shooting scene information item among the shooting scene information items stored in the storing means that is correlated with the position information item corresponding to the GPS information acquired by the acquiring means, and in the at least one case, the scene recognizing means reduces the number of the shooting scene candidate information items to be less than the number of the plural shooting scene information items that the shooting scene information item group has and uses the shooting scene candidate information items as information items corresponding to the shooting scene information items, and among the shooting scene candidate information items, the scene recognizing means recognizes, as the shooting scene at the current shooting location, the shooting scene candidate represented by the shooting scene candidate information item to which at least one of the subject image acquired by the shooting means and the shooting support information is similar with a degree of similarity equal to or greater than the predetermined degree of similarity.

Further, a shooting device of a fourth aspect of the present invention is the shooting device of any of the first aspect to the third aspect of the present invention, wherein the storing means further correlates, with the shooting scene information items, and stores time information items representing times of the shooting scenes represented by the shooting scene information items, the shooting device further includes time acquiring means that acquires the current time, and in the case where the GPS information acquired by the acquiring means activated by the activating means corresponds to a position information item stored in the storing means, the scene recognizing means selects, from the plural shooting scene candidate information items, shooting scene candidate information items to which at least one of the subject image acquired by the shooting means and the shooting support information is similar with a degree of similarity equal to or greater than the predetermined degree of similarity, and among the selected shooting scene candidate information items, the scene recognizing means recognizes, as the shooting scene at the current shooting location, the shooting scene candidate represented by the shooting scene candidate information item corresponding to the shooting scene information item among the shooting scene information items stored in the storing means that is correlated with the position information item corresponding to the GPS information acquired by the acquiring means and the time information item corresponding to the current time acquired by the time acquiring means.

Further, a shooting device of a fifth aspect of the present invention is the shooting device of the fourth aspect of the present invention, wherein the storing means further correlates, with the shooting scene information items, and stores degrees of reliability of the shooting scenes represented by the shooting scene information items, and in the case where the GPS information acquired by the acquiring means activated by the activating means corresponds to a position information item stored in the storing means, the scene recognizing means selects, from the plural shooting scene candidate information items, shooting scene candidate information items to which at least one of the subject image acquired by the shooting means and the shooting support information is similar with a degree of similarity equal to or greater than the predetermined degree of similarity, and among the selected shooting scene candidate information items, the scene recognizing means recognizes, as the shooting scene at the current shooting location, the shooting scene candidate represented by the shooting scene candidate information item corresponding to the shooting scene information item among the shooting scene information items stored in the storing means that is correlated with the position information item corresponding to the GPS information acquired by the acquiring means and the time information item corresponding to the current time acquired by the time acquiring means and which has a degree of reliability equal to or greater than a predetermined degree of reliability.

Further, a shooting device of a sixth aspect of the present invention is the shooting device of any of the first aspect to the third aspect of the present invention, wherein the storing means further correlates, with the shooting scene information items, and stores degrees of reliability of the shooting scenes represented by the shooting scene information items, and in the case where the GPS information acquired by the acquiring means activated by the activating means corresponds to a position information item stored in the storing means, the scene recognizing means selects, from the plural shooting scene candidate information items, shooting scene candidate information items to which at least one of the subject image acquired by the shooting means and the shooting support information is similar with a degree of similarity equal to or greater than the predetermined degree of similarity, and among the selected shooting scene candidate information items, the scene recognizing means recognizes, as the shooting scene at the current shooting location, the shooting scene candidate represented by the shooting scene candidate information item corresponding to the shooting scene information item among the shooting scene information items stored in the storing means that is correlated with the position information item corresponding to the GPS information acquired by the acquiring means and which has a degree of reliability equal to or greater than a predetermined degree of reliability.

Further, a shooting device of a seventh aspect of the present invention is the shooting device of the fifth aspect or the sixth aspect of the present invention, wherein the degrees of reliability are expressed as binary values.

Further, a shooting device of an eighth aspect of the present invention is the shooting device of any of the first to seventh aspects of the present invention and is configured to further include accepting means that accepts an instruction to change the storage contents of the storing means and changing means that changes the storage contents of the storing means in accordance with the instruction accepted by the accepting means.

Further, a shooting device of a ninth aspect of the present invention is the shooting device of any of the first to eighth aspects of the present invention, wherein the acquiring means is configured to be capable of acquiring the GPS information in a predetermined cycle after the acquiring means has been activated by the activating means, and the shooting device is configured to further include cycle changing means that changes the cycle in a case where a change condition predetermined as a condition for changing the cycle has been met.

Further, a shooting device of a tenth aspect of the present invention is the shooting device of the ninth aspect of the present invention, further including shooting scene detecting means that detects a change in the shooting scene at the shooting location on the basis of image information acquired by the shooting means, wherein the change condition is a condition where a change in the shooting scene has been detected by the shooting scene detecting means.

Further, a shooting device of an eleventh aspect of the present invention is the shooting device of the tenth aspect of the present invention, further including power detecting means that detects the amount of residual power in a power source for driving the shooting device, wherein the change condition is a condition where an amount of residual power equal to or greater than a reference value has been detected by the power detecting means and a change in the shooting scene has been detected by the shooting scene detecting means.

Further, a shooting device of a twelfth aspect of the present invention is the shooting device of the ninth aspect of the present invention, further including power detecting means that detects the amount of residual power in a power source for driving the shooting device, wherein the change condition is a condition where an amount of residual power equal to or greater than a reference value has been detected by the power detecting means.

Further, a shooting device of a thirteenth aspect of the present invention is the shooting device of any of the first to eighth aspects of the present invention, wherein the storing means further correlates, with each of the position information items, and stores degrees of similarity between the shooting scenes represented by the shooting scene information items correlated with the position information items and shooting scenes included in predetermined regions including the positions represented by the position information items, the acquiring means is configured to be capable of acquiring the position information items in a predetermined cycle after the acquiring means has been activated by the activating means, and the shooting device is configured to further include cycle changing means that lengthens the cycle as the degree of similarity correlated with the position information item corresponding to the GPS information acquired by the acquiring means becomes greater.

Further, a shooting device of a fourteenth aspect of the present invention is the shooting device of any of the first to thirteenth aspects of the present invention, further including power detecting means that detects the amount of residual power in a power source for driving the shooting device, wherein the acquiring means acquires, in the case where it has been activated, the GPS information when an amount of residual power equal to or greater than a reference value has been detected by the power detecting means.

Further, a shooting device of a fifteenth aspect of the present invention is the shooting device of any of the first to fourteenth aspects of the present invention, wherein the degree of precision of the position information items is lower than the degree of precision required in the case of recognizing addresses on a map.

Furthermore, in order to achieve the above object, a program of a sixteenth aspect of the present invention is a program for causing a computer to function as: activating means which, in a case where a predetermined condition has been met, activates acquiring means which, in a case where it has been activated, utilizes GPS to acquire GPS information identifying the position of a shooting location; and scene recognizing means which, in a case where the GPS information acquired by the acquiring means activated by the activating means corresponds to a position information item stored in storing means in which position information items representing geographical positions identifiable by the GPS information and shooting scene information items representing shooting scenes at the positions represented by the position information items are intercorrelated and stored beforehand, recognizes the shooting scene at the current shooting location on the basis of the shooting scene information item correlated with that position information item and at least one of a subject image acquired by shooting means that shoots a subject to thereby acquire a subject image and shooting support information that is acquired prior to shooting for acquiring the subject image and supports that shooting, wherein in the case where the GPS information acquired by the acquiring means activated by the activating means corresponds to a position information item stored in the storing means, the scene recognizing means selects, from plural shooting scene candidate information items representing predetermined plural shooting scene candidates, shooting scene candidate information items to which at least one of the subject image acquired by the shooting means and the shooting support information is similar with a degree of similarity equal to or greater than a predetermined degree of similarity, and among the selected shooting scene candidate information items, the scene recognizing means recognizes, as the shooting scene at the current shooting location, the shooting scene candidate represented by the shooting scene candidate information item corresponding to the shooting scene information item among the shooting scene information items stored in the storing means that is correlated with the position information item corresponding to the GPS information acquired by the acquiring means.

According to the present invention, there is obtained the effect that shooting scenes according to the situation can be recognized with a high degree of precision.

BRIEF DESCRIPTION OF DRAWINGS

FIG. 1 is a block diagram showing an example of the configuration of main portions of an electrical system of a digital camera pertaining to an embodiment;

FIG. 2 is a schematic diagram (1) showing an example of the structures of databases pertaining to the embodiment;

FIG. 3 is a schematic diagram (2) showing an example of the structure of a database pertaining to the embodiment;

FIG. 15 is a schematic diagram showing an example modification of the structure of one of the databases pertaining to the embodiment.

DETAILED DESCRIPTION

Figure 4:
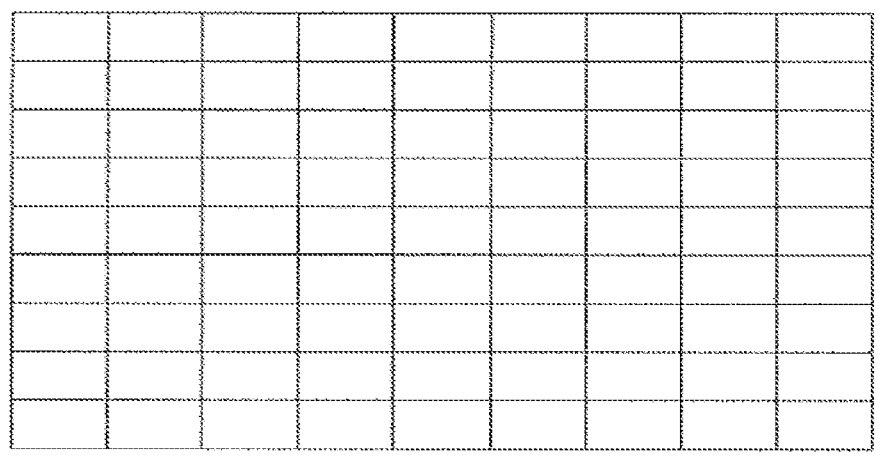
FIG. 4 is a conceptual diagram (1) provided for describing the degree of fineness of GPS information received by a GPS receiver pertaining to the embodiment.

First, the configuration of main portions of an electrical system of a digital camera 10 pertaining to the present embodiment will be described with reference to FIG. 1.

As shown in the same figure, the digital camera 10 pertaining to the present embodiment is configured to include an optical unit 22 that is configured to include a lens for imaging a subject image, a charge-coupled device (hereinafter called a "CCD") 24 that is placed on the rear side of the optical axis of the lens, and an analog signal processor 26 that performs various types of analog signal processing with respect to input analog signals.

Further, the digital camera 10 is configured to include an analog-to-digital converter (hereinafter called an "ADC") 28 that converts input analog signals into digital data and a digital signal processor 30 that performs various types of digital signal processing with respect to input digital data.

The digital signal processor 30 has a built-in line buffer having a predetermined capacity and also performs control that causes the input digital data to be directly stored in a predetermined region of a later-described memory 48.

The output end of the CCD 24 is connected to the input end of the analog signal processor 26, the output end of the analog signal processor 26 is connected to the input end of the ADC 28, and the output end of the ADC 28 is connected to the input end of the digital signal processor 30. Consequently, the analog signals representing the subject image output from the CCD 24 are subjected to predetermined analog signal processing by the analog signal processor 26 and are converted into digital image data by the ADC 28, and thereafter the digital image data are input to the digital signal processor 30.

The digital camera 10 is configured to include a liquid crystal display (hereinafter called an "LCD") 38 that displays images obtained by shooting, menu screens, and so forth, an LCD interface 36 that generates signals for causing the images, menu screens, and so forth to be displayed on the LCD 38 and supplies the signals to the LCD 38, a central processing unit (CPU) 40 that controls the operation of the entire digital camera 10, a memory 48 that has a primary storage section that temporarily stores the digital image data obtained by shooting and so forth and a secondary storage section that stores information that should be retained even if the power is switched off, and a memory interface 46 that controls access to the memory 48.

Further, the digital camera 10 is configured to include an external memory interface 50 for enabling access to a portable memory card 52 by the digital camera 10 and a compression/decompression circuit 54 that compresses and decompresses the digital image data.

In the digital camera 10 of the present embodiment, a flash memory is used as the memory 48 and an x-D Picture Card (registered trademark) is used as the memory card 52, but the embodiment of the present invention is not limited to this.

Further, the digital camera 10 is equipped with a communication interface 57 that is connected to an external device (not shown in the drawings) such as a personal computer or another digital camera via a network (e.g., the Internet, a local area network, etc.) and controls the transmission and reception of various types of information to and from the external device.

Moreover, the digital camera 10 is equipped with a GPS receiver 58 that receives radio waves transmitted from GPS satellites to thereby receive GPS information (in the present embodiment, longitude, latitude, and elevation) identifying the current geographical position and time information representing the current time.

The digital signal processor 30, the LCD interface 36, the CPU 40, the memory interface 46, the external memory interface 50, the compression/decompression circuit 54, the communication interface 57, and the GPS receiver 58 are connected to one another via a system bus BUS. Consequently, the CPU 40 can control the activation of the digital signal processor 30, the compression/decompression circuit 54, and the GPS receiver 58, acquire the GPS information and the time information received by the GPS receiver 58, display various types of information on the LCD 38 via the LCD interface 36, access the memory 48 via the memory interface 46, access the memory card 52 via the external memory interface 50, and access the external device via the communication interface 57.

The digital camera 10 is also equipped with a timing generator 32 that mainly generates timing signals (pulse signals) for driving the CCD 24 and supplies the timing signals to the CCD 24. The driving of the CCD 24 is controlled by the CPU 40 via the timing generator 32.

Moreover, the digital camera 10 is also equipped with a motor driver 34, and the driving of a non-illustrated focusing motor, zoom motor, and aperture drive motor disposed in the optical unit 22 is also controlled by the CPU 40 via the motor driver 34.

That is, the aforementioned lens pertaining to the present embodiment includes plural lenses, is configured as a zoom lens system whose focal length can be changed (whose magnification can be varied), and is equipped with a non-illustrated lens drive mechanism. The aforementioned focusing motor, zoom motor, and aperture drive motor are included in the lens drive mechanism, and these motors are driven by drive signals supplied from the motor driver 34 by the control of the CPU 40.

Moreover, the digital camera 10 is equipped with an operation unit 56 that is configured to include a release button (a so-called shutter button) that is pressingly operated when executing shooting and a power switch that is operated when switching the power of the digital camera 10 on and off. Further, the operation unit 56 is configured to include a transparent touch panel overlaid on the LCD 38. Various types of information are displayed on the display surface of the LCD 38, and the operation unit 56 accepts information and instructions as a result of the user touching the touch panel. For example, in the digital camera 10 pertaining to the present embodiment, various types of buttons are displayed on the display surface of the LCD 38, such as a shooting mode designation button that is pressingly operated when setting a shooting mode that enables shooting to be performed, a scene-differentiated shooting mode designation button that is pressingly operated when setting a scene-differentiated shooting mode that enables shooting to be performed in shooting conditions suited to different shooting scenes, a shooting scene designation button that is pressingly operated when designating a shooting scene in the scene-differentiated shooting mode, a playback mode designation button that is pressingly operated when setting the digital camera 10 to a playback mode that is a mode that plays back on the LCD 38 images obtained by shooting, a menu display button that is pressingly operated when causing various types of menu screens to be displayed on the LCD 38, an enter button that is pressingly operated when finalizing the details of an operation performed up until then, a cancel button that is pressingly operated when canceling the details of an operation performed just before, and a screen return button that is pressingly operated when returning to the previous screen. The various types of buttons displayed on the display surface of the LCD 38 are pressingly operated as a result of being touched by the user via the touch panel. In the present embodiment, some of the instructions that the user gives to the digital camera 10 are realized by a touch panel display, but the digital camera 10 is not limited to this and may also have a configuration where the user gives instructions to the digital camera 10 using a numerical keypad and operation buttons without using a touch panel display.

The operation unit 56 configured in this way is connected to the CPU 40. Consequently, the CPU 40 can always grasp states of operation with respect to the operation unit 56.

The release button of the digital camera 10 pertaining to the present embodiment is configured in such a way that two stages of pressing operation are detectable: a state in which the release button is depressed to an intermediate position (hereinafter called a "half-pressed state") and a state in which the release button is depressed to a final depressed position beyond the intermediate position (hereinafter called a "completely pressed state").

Additionally, in the digital camera 10, when the release button is depressed to the half-pressed state, an automatic exposure (AE) function works so that the state of exposure (shutter speed, the state of the aperture) is set and then an AF function works so that focusing is controlled. Thereafter, when the release button is subsequently depressed to the completely pressed state, exposure (shooting) is performed.

Further, the digital camera 10 is equipped with an electronic flash 44, which emits light for illuminating the subject as needed during shooting, and a charger 42, which is interposed between the electronic flash 44 and the CPU 40 and charges the electronic flash 44 with power to allow the electronic flash 44 to emit light under the control of the CPU 40. The electronic flash 44 is also connected to the CPU 40, and the emission of light by the electronic flash 44 is controlled by the CPU 40.

Incidentally, the digital camera 10 pertaining to the present embodiment has, as a function for aiding the user when having the user designate the shooting scene suited to the current shooting location in a state in which the scene-differentiated shooting mode has been set as mentioned above, a shooting scene recommendation function that recognizes the shooting scene at the current shooting location and recommends the recognized shooting scene to the user. In order to realize this shooting scene recommendation function, in the digital camera 10 pertaining to the present embodiment, databases A and B shown in FIG. 2 and a database C shown in FIG. 3 as an example are stored beforehand in the memory 48.

FIG. 2 is a schematic diagram showing an example of the structures of the databases A and B. The databases A and B shown in FIG. 2 are used in order to derive shooting scene information items for recognizing (identifying) the shooting scene at the current shooting location on the basis of objects (e.g., blue sky, evening sky, green leaves, snow, water, etc.) included in a subject image obtained by shooting and colors included in the subject image. The databases A and B both have first shooting scene candidate information items as shooting scene information items for recognizing plural shooting scenes (first shooting scene candidates). In a case where a first shooting scene candidate recognized by a first shooting scene candidate information item is characterized by a specific object, an object information item for recognizing that object is correlated with the first shooting scene candidate information item. Further, color information items which, when a first shooting scene candidate is displayed as an image on the display surface of the LCD 38, are for recognizing the colors included in that image are correlated with the first shooting scene candidate information items. Further, occupation percentages representing percentages of regions occupied by the colors recognized by the color information items with respect to the total region of the image when a first shooting scene candidate is displayed on the display surface of the LCD 38 are correlated with the color information items.

The database B differs from the database A in that the number of the first shooting scene candidates is fewer in the database B. In the example shown in FIG. 2, a first shooting scene candidate for recognizing a beach and a first shooting scene candidate for recognizing snow are included in the database A but are not included in the database B.

FIG. 3 is a schematic diagram showing an example of the structure of the database C. The database C shown in FIG. 3 is used in order to derive shooting scene information items for recognizing the shooting scene at the current shooting location on the basis of the GPS information and the time information received by the GPS receiver 58. The database C has second shooting scene candidate information items serving as shooting scene information items for recognizing plural shooting scenes (second shooting scene candidates), and the second shooting scene candidate information items correspond to the first shooting scene candidate information items included in the database A. Further, position information items, which are information items that represent the latitudes, longitudes, and elevations pertaining to the shooting scenes corresponding to the second shooting scene candidates recognized by the second shooting scene candidate information items and represent geographical positions identifiable by the GPS information, and time frames are correlated with the second shooting scene candidate information items. Further, degrees of reliability in cases where the second shooting scene candidates uniquely derived by the position information items and the time frames are employed as final shooting scenes are correlated with single sets of the position information items and the time frames.

The digital camera 10 pertaining to the present embodiment is equipped with a current location display mode that utilizes map software to display a map on the LCD 38, identifies the geographical name (country name, prefecture name, city name, address, etc.) of the current position on the basis of the GPS information (latitude, longitude) received by the GPS receiver 58, and displays the identified position together with the geographical name on the map. The current location display mode starts up as a result of an instruction being given by the user via the operation unit 56, and the screen region of the LCD 38 is divided by an imaginary mesh (a rectangular mesh of uniform size that is not actually displayed on the screen) with which addresses are identifiable as shown in FIG. 4 as an example on the basis of the GPS information received by the GPS receiver 58. FIG. 4 is an on-map position identification map whose degree of positional precision is fine.

Figure 5:
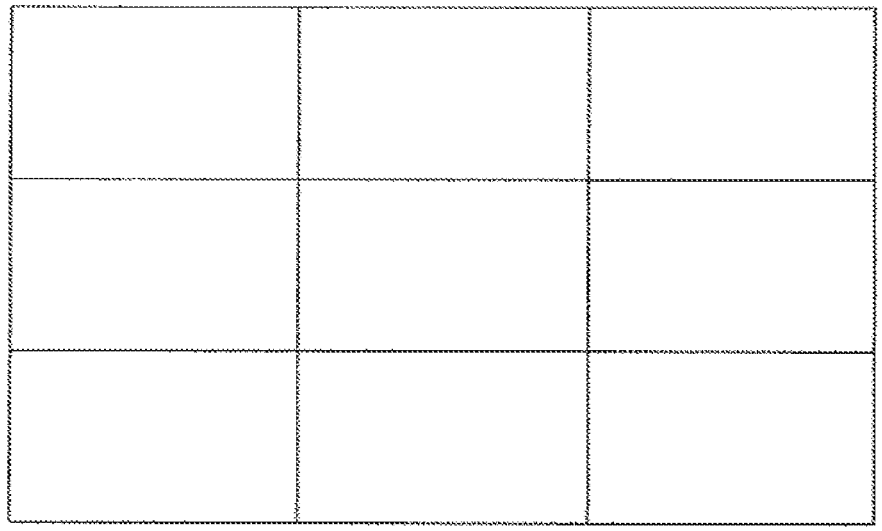
FIG. 5 is a conceptual diagram (2) provided for describing the degree of fineness of the GPS information received by the GPS receiver pertaining to the embodiment.

In contrast, in the scene-differentiated shooting mode, in the case of using the shooting scene recommendation function to recognize the shooting scene at the current shooting location, fine division (degree of precision) of the screen region is not required as much as in the current location display mode. For that reason, in the scene-differentiated shooting mode, the screen region is divided by an imaginary mesh with which shooting scenes are identifiable as shown in FIG. 5 as an example and in which the mesh openings are larger compared to the ones in the mesh used in the current location display mode. FIG. 5 is a scene recognition map whose degree of positional precision is rough, and the scene recognition map can be used in order to output the certainty of each scene on the basis of the GPS information (latitude, longitude).

Figure 6:
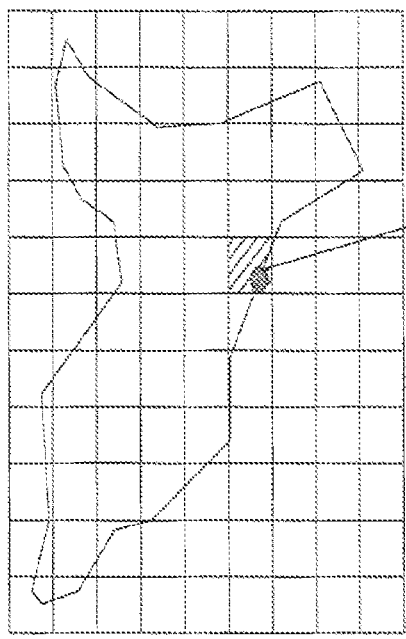
FIG. 6 is a conceptual diagram for describing degrees of reliability of a shooting scene at a position identified by the GPS information received by the GPS receiver pertaining to the embodiment.

In the present embodiment, each position information item included in the database C defines the position and size of the mesh. That is, each of the position information items included in the database C pertaining to the present embodiment is configured to include latitude and longitude information representing the latitude and longitude of each of the upper left point and the lower right point (diagonal points) of the mesh and elevation information representing the lowest elevation and the highest elevation in the area defined by the mesh. Because of this, using the database C shown in FIG. 3, the second shooting scene candidates and the degrees of reliability of those second shooting scene candidates are uniquely decided as shown in FIG. 6 as an example from the GPS information received by the GPS receiver 58. In the example shown in FIG. 6, degrees of reliability (indicated as "beach-likeness: val_beach", "snow-likeness: val_snow", and "green-likeness: val_green") regarding each of "beach", "snow" (which corresponds to "snow" included in database C shown in FIG. 3), and "green" are shown as second shooting scene candidates corresponded to the mesh identified by the position information items. Further, in the present embodiment, the degrees of reliability are expressed as percentages, but the degrees of reliability are not limited to this and may also be defined by the binary values of ON and OFF as shown in FIG. 6 as an example. In this case, a reduction in the storage capacity of the memory 48 required to store the degrees of reliability can be expected.

Next, the overall operation, during shooting, of the digital camera 10 pertaining to the present embodiment will be briefly described.

First, the CCD 24 performs shooting via the optical unit 22 and sequentially outputs analog signals of red (R), green (G), and blue (B) representing the subject image to the analog signal processor 26.

The analog signal processor 26 performs analog signal processing such as correlated double sampling on the analog signals input from the CCD 24 and thereafter sequentially outputs the processed analog signals to the ADC 28.

The ADC 28 converts the analog signals of R, G, and B input from the analog signal processor 26 into R, G, and B signals of predetermined numbers of bits (digital image data) and sequentially outputs the digital image data to the digital signal processor 30. The digital signal processor 30 accumulates the digital image data sequentially input from the ADC 28 in the built-in line buffer and directly stores the digital image data in a predetermined region of the memory 48.

The digital image data stored in the predetermined region of the memory 48 are read out by the digital signal processor 30 in accordance with the control by the CPU 40, and the digital signal processor 30 performs white balance adjustment by multiplying the digital gains of R, G, and B according to a predetermined physical quantity and also performs gamma processing and sharpness processing to generate digital image data of a predetermined number of bits.

Additionally, the digital signal processor 30 performs YC signal processing on the generated digital image data to generate luminance signals Y and chroma signals Cr and Cb (hereinafter called "YC signals") and stores the YC signals in a region of the memory 48 differing from the aforementioned predetermined region.

The LCD 38 is configured in such a way that it can display a moving image (a through image) obtained by continuous shooting by the CCD 24 so that the LCD 38 can be used as a viewfinder. In the case of using the LCD 38 as a viewfinder, the digital signal processor 30 sequentially outputs the generated YC signals to the LCD 38 via the LCD interface 36. Because of this, the through image becomes displayed on the LCD 38.

Here, at the timing when the release button is depressed to the half-pressed state by the user, as described above, the AE function works so that the exposure state is set and thereafter the aforementioned mountain climbing focusing function works so that focusing is controlled, and thereafter, at the timing when the release button is depressed to the completely pressed state, the YC signals stored in the memory 48 at that point in time are compressed in a predetermined compression format (in the present embodiment, the JPEG format) by the compression/decompression circuit 54 and then the compressed YC signals are recorded as a digitized file (an image file) in the memory card 52 via the external memory interface 50, whereby shooting is performed.

Figure 7:
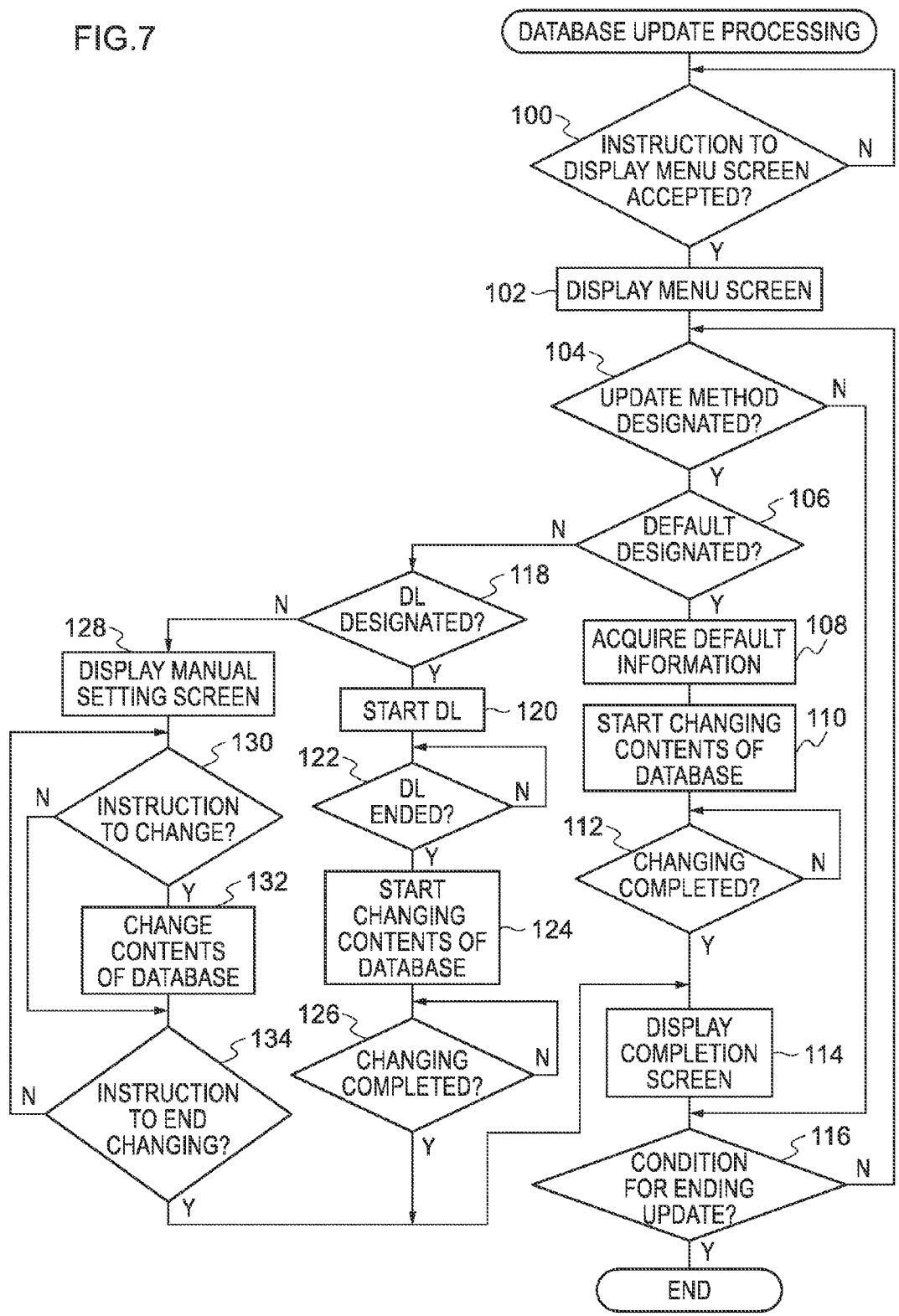
FIG. 7 is a flowchart showing an example of a flow of processing by a database update processing program pertaining to the embodiment.

Next, the action of the digital camera 10 in the case of updating the contents of the database C will be described with reference to FIG. 7. FIG. 7 is a flowchart showing an example of a flow of processing by a database update processing program executed by the CPU 40 in a case where the power of the digital camera 10 has been switched on. This program is stored beforehand in a predetermined program storage region of the memory 48. Further, here, in order to avoid confusion, a case where it is assumed that the contents of the database C are configured by default information (information at the time of default settings) will be described. Further, here, in order to avoid confusion, a case where it is assumed that the digital camera 10 is connected to a server device (not shown in the drawings) of the manufacturer of the digital camera 10 via the communication interface 57 will be described. Further, here, in order to avoid confusion, a case where it is assumed that a second shooting scene candidate to which a position information item and a time frame corresponding to the GPS information and the time information received by the GPS receiver 58 belong is being designated will be described.

In step 100, the CPU 40 stands by until update instruction information instructing a method of updating the database C is accepted via the operation unit 56. When the update instruction information is accepted in step 100, the CPU 40 moves to step 102. In step 102, the CPU 40 displays on the LCD 38 a menu screen 60 (see FIG. 8) for allowing the user to designate a method of updating the database. Thereafter, the CPU 40 moves to step 104 where it determines whether or not a method of updating the database C has been designated.

Figure 8:
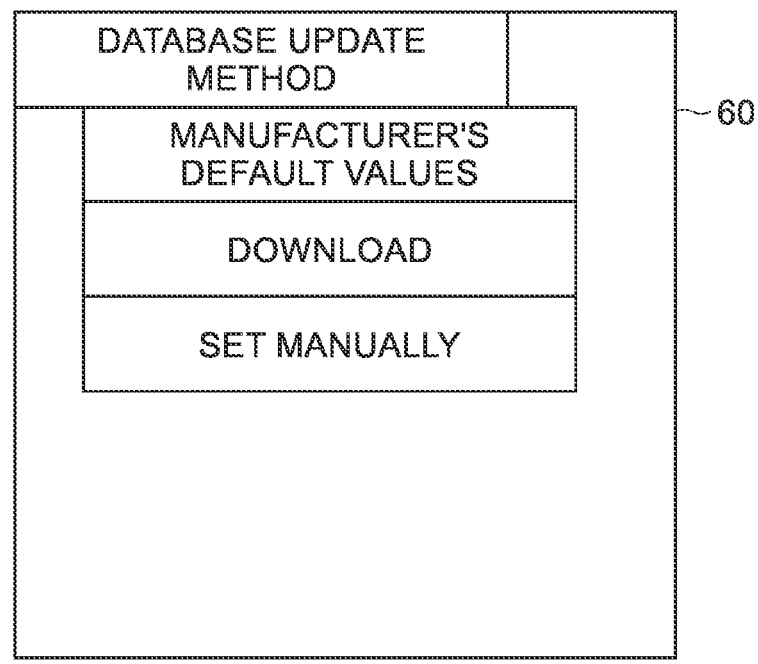
FIG. 8 is a schematic diagram showing an example of a menu screen pertaining to the embodiment.

FIG. 8 shows an example of the menu screen 60 displayed on the LCD 38. As shown in FIG. 8, on the menu screen 60, under a heading called "Database Update Method", there are displayed a designatable subheading called "Manufacturer's Default Values", which is for updating the current contents of the database C to default information that the manufacturer stored beforehand in a predetermined storage region of the memory 48 at the time of manufacture of the digital camera 10, a designatable subheading called "Download", which is for updating the current contents of the database C to information electronically transmitted via the network from the manufacturer, and a designatable subheading called "Set Manually", which is for changing the current contents of the database C in accordance with instructions given by the user via the operation unit 56. In a case where any of the designatable subheadings of "Manufacturer's Default Values", "Download", and "Set Manually" has been designated by the user via the operation unit 56 in a state in which the menu screen 60 is being displayed, the determination in step 104 becomes yes and the CPU 40 moves to step 106. In a case where none of the designatable subheadings on the menu screen 60 has been designated, the CPU 40 moves to step 116.

In step 106, the CPU 40 determines whether or not the designatable subheading called "Manufacturer's Default Values" on the menu screen 60 (update to default information) has been designated. In a case where the determination is yes, the CPU 40 moves to step 108 where it acquires the default information stored in the predetermined storage region of the memory 48. In the next step 110, the CPU 40 starts changing specific contents of the current database C to the default information acquired by the processing of step 108. Thereafter, the CPU 40 moves to step 112. In step 112, the CPU 40 stands by until the changing of the specific contents of the database C to the default information is completed. In step 112, the determination becomes yes when the changing of the specific contents of the database C to the default information is completed. Then, the CPU 40 moves to step 114 where it displays on the LCD 38 information (e.g., a message stating "Database has been properly updated.") showing that the changing of the specific contents of the database C has been completed. Thereafter, the CPU 40 moves to step 116.

In a case where the determination is no in step 106, the CPU 40 moves to step 118 where it determines whether or not the designatable subheading called "Download" (abbreviated as "DL" in the example shown in FIG. 7) on the menu screen 60 has been designated. In a case where the determination is yes, the CPU 40 moves to step 120 where it starts downloading contents for the database C from the server device of the manufacturer. Thereafter, the CPU 40 moves to step 122 where it stands by until the download of the specific contents for the database C ends. When the download ends in step 122, the CPU 40 moves to step 124.

In step 124, the CPU 40 starts changing specific contents of the database C to the information downloaded by the processing of steps 120 and 122. In the next step 126, the CPU 40 stands by until the changing of the specific contents of the database C is completed. In step 126, the determination becomes yes when the changing of the specific contents of the database C is completed. Then, the CPU 40 moves to step 114.

In a case where the determination in step 118 is no (a case where the designatable subheading called "Set Manually" has been designated), the CPU 40 moves to step 128. In step 128, the CPU 40 displays on the LCD 38 a manual setting screen 62 for changing the current contents of the database C in accordance with the instructions of the user. Thereafter, the CPU 40 moves to step 130 where it determines whether or not an instruction for changing specific contents of the database C has been accepted via the operation unit 56.

Figure 9:
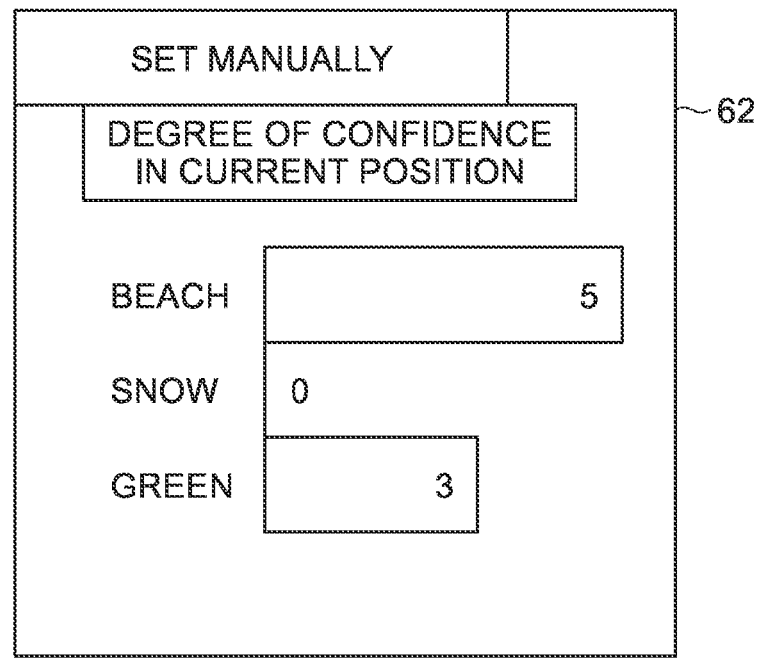
FIG. 9 is a schematic diagram showing an example of a manual setting screen pertaining to the embodiment.

FIG. 9 shows an example of the manual setting screen 62 displayed on the LCD 38. As shown in FIG. 9, on the manual setting screen 62, under a heading called "Set Manually", a subheading called "Degrees of Confidence in Current Position" (which corresponds to the "Degrees of Reliability" included in the database C shown in FIG. 3) is displayed, and under that subheading, second shooting scene candidates designated at the current point in time and "degrees of confidence in current position" corresponding to the degrees of reliability correlated with these second shooting scene candidates are shown in the form of a chart. In the example shown in FIG. 9, the fact that the "degree of confidence in current position" regarding the second shooting scene candidate of "beach" is 5%, the fact that the "degree of confidence in current position" regarding the second shooting scene candidate of "snow" is 0%, and the fact that the "degree of confidence in current position" regarding the second shooting scene candidate of "green" is 3% are displayed.

In a case where an instruction to change a "degree of confidence in current position" has been accepted via the operation unit 56 in a state in which the manual setting screen 62 is being displayed, the determination becomes yes and the CPU 40 moves to step 132 where it changes the appropriate degree of reliability in the database C in accordance with the change instruction accepted by the processing of step 130. For example, in the manual setting screen 62 shown in FIG. 9, by giving, with respect to the graphic (a horizontally long rectangle in the example shown in FIG. 9) representing the "degree of confidence in current position" regarding the second shooting scene candidate of "beach", an instruction via the touch panel in the direction in which the length of the graphic in the lengthwise direction is lengthened and shortened, the graphic on the display surface of the LCD 38 becomes longer or shorter in accordance with this instruction and the degree of reliability in the database C corresponding to the "degree of confidence in current position" also increases or decreases in accordance with how much the graphic is lengthened or shortened. For example, if the graphic representing the "degree of confidence in current position" regarding the second shooting scene candidate of "beach" is lengthened by "1" in the lengthwise direction on the display surface of the LCD 38, the degree of reliability in the database C corresponding to the "degree of confidence in current position" corresponding thereto is also increased by "1", and if the graphic representing the "degree of confidence in current position" regarding the second shooting scene candidate of "beach" is shortened by "1" in the lengthwise direction on the display surface of the LCD 38, the degree of reliability in the database C corresponding to the "degree of confidence in current position" corresponding thereto is also decreased by "1".

In the next step 134, the CPU 40 determines whether or not an instruction to end the changing of the predetermined contents of the database C has been accepted via the operation unit 56. In a case where the determination is no, the CPU 40 returns to step 130. In a case where the determination is yes, the CPU 40 moves to step 114.

In step 116, the CPU 40 determines whether or not a condition predetermined as a condition for ending the updating of the database C (e.g., a condition where a predetermined operation has been performed with respect to the operation unit 56) has been met. In a case where the determination is no, the CPU 40 moves to step 104. In a case where the determination is yes, the CPU 40 ends the database update processing program.

Figure 10:
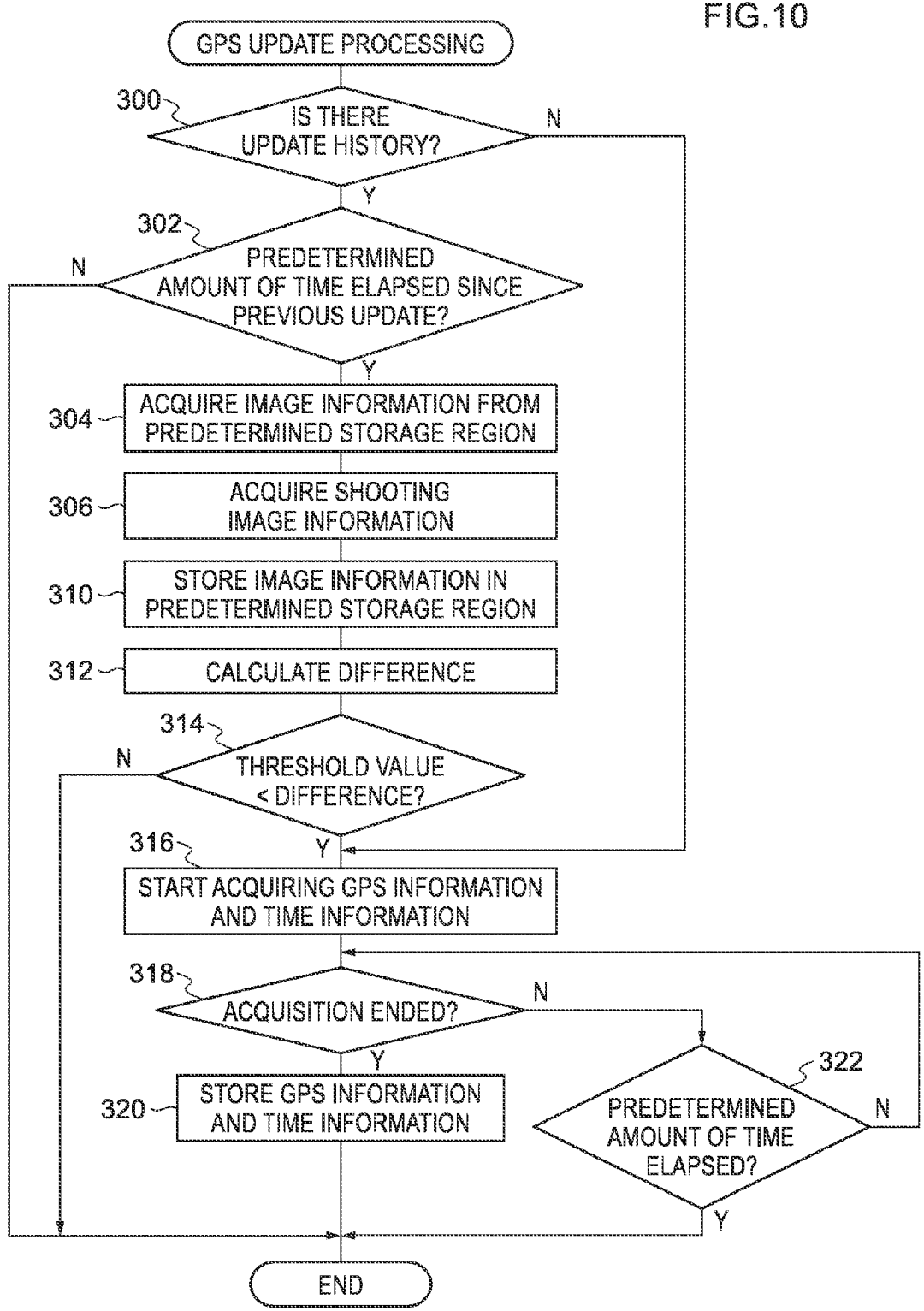
FIG. 10 is a flowchart showing an example of a flow of processing by a GPS update processing program (1) pertaining to the embodiment.

Next, the action of the digital camera 10 in the case of acquiring the GPS information and the time information with the GPS receiver 58 will be described with reference to FIG. 10. FIG. 10 is a flowchart showing an example of a flow of processing by a GPS update processing program executed in a predetermined cycle by the CPU 40 in a case where a condition for activating the GPS receiver 58 (e.g., a condition where the scene-differentiated shooting mode has been set) has been met. This program is stored beforehand in a predetermined program storage region of the memory 48. Further, here, in order to avoid confusion, a case where it is assumed that a single frame's worth of image information (e.g., YC signals) obtained by shooting is stored in a predetermined storage region α of the memory 48 as an evaluation target (image information for obtaining a later-described difference) used in the GPS update processing will be described.

In step 300 of FIG. 10, the CPU 40 determines whether or not the GPS information and the time information has been received by the GPS receiver 58 between the time when the power of the digital camera 10 was switched on and the current point in time (whether or not there is a history that has been updated between the time when the power of the digital camera 10 was switched on and the current point in time). In a case where the determination is yes, the CPU 40 moves to step 302. In a case where the determination is no, the CPU 40 moves to step 316.

In step 302, the CPU 40 determines whether or not a predetermined amount of time (e.g., 60 seconds) has elapsed since the GPS information and the time information was received the previous time by the GPS receiver 58. In a case where the determination is no, the CPU 40 ends the GPS update processing program. In a case where the determination is yes, the CPU 40 moves to step 304 where it acquires the image information (e.g., YC signals) from the predetermined storage region α of the memory 48 and erases the storage contents of the storage region α. Thereafter, the CPU 40 moves to step 306 where it acquires the most recent single frame's worth of image information (e.g., YC signals) obtained by shooting. Thereafter, the CPU 40 moves to step 310. In step 310, the CPU 40 stores the image information acquired by the processing of step 306 in the storage region α of the memory 48. Thereafter, the CPU 40 moves to step 312 where it calculates the difference (in the present embodiment, "the absolute value of the difference") between the image information acquired by the processing of step 304 and the image information acquired by the processing of step 306. In the present embodiment, an example configuration where the CPU 40 calculates the difference between the sets of image information as an amount of change in the shooting scene is given, but the CPU 40 is not limited to this and may also calculate the amount of change in any of photometric values, zone photometric values, focus positions, focus evaluation values, and face detection results.

In the next step 314, the CPU 40 determines whether or not the difference calculated by the processing of step 312 exceeds a predetermined threshold value. In a case where the determination is no, the CPU 40 ends the GPS update processing program. In a case where the determination is yes, the CPU 40 moves to step 316. In step 316, the CPU 40 starts acquiring the GPS information and the time information by receiving, via the GPS receiver 58, radio waves transmitted from GPS satellites. In a case where the determination is yes in the next step 318, the CPU 40 moves to step 320 where it stores the GPS information and the time information acquired by the processing of steps 316 and 318 in a storage region β of the memory 48. Thereafter, the CPU 40 ends the GPS update processing program. The storage contents of the storage region β are erased in a case where the setting of the scene-differentiated shooting mode has been cancelled, a case where the power switch of the digital camera 10 has been switched off, and a case where the determination is yes in step 204 of a later-described scene recognition processing program.

In a case where the determination is no in step 318, the CPU 40 moves to step 322 where it determines whether or not a predetermined amount of time (e.g., 10 seconds) has elapsed since the processing of step 316 was executed. In a case where the determination is no, the CPU 40 returns to step 318. In a case where the determination is yes, the CPU 40 ends the GPS update processing program.

Figure 11:
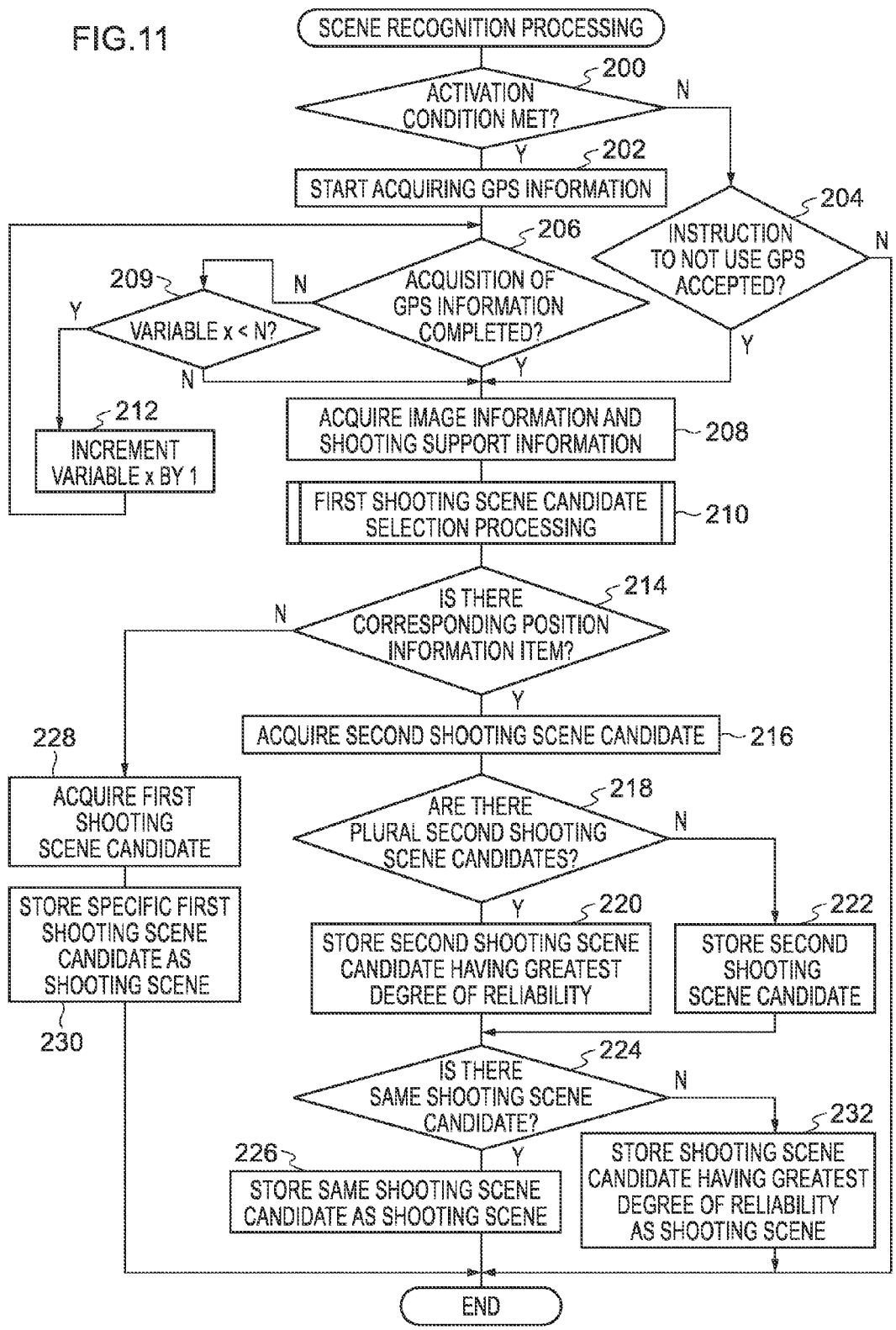
FIG. 11 is a flowchart showing an example of a flow of processing by a scene recognition processing program pertaining to the embodiment.

Next, the action of the digital camera 10 in the case of recognizing the shooting scene at the current shooting location in the aforementioned shooting scene recommendation function will be described with reference to FIG. 11. FIG. 11 is a flowchart showing an example of a flow of processing by a scene recognition processing program executed every predetermined amount of time (e.g., every 15 seconds) by the CPU 40 when the power of the digital camera 10 has been switched on. This program is stored beforehand in a predetermined program storage region of the memory 48.

In step 200, the CPU 40 determines whether or not a condition for activating the GPS receiver 58 (e.g., a condition where the scene-differentiated shooting mode has been set) has been met. In a case where the determination is yes, the CPU 40 moves to step 202. In a case where the determination is no, the CPU 40 moves to step 204 where it determines whether or not instruction information instructing the digital camera 10 to not receive information with the GPS receiver 58 (to not use GPS) has been accepted by the operation unit 56. In a case where the determination is yes, the CPU 40 moves to step 208. In case where the determination is no, the CPU 40 ends the scene recognition processing program.

In step 202, the CPU 40 accesses the storage region β of the memory 48 and starts acquiring the GPS information and the time information. Thereafter, the CPU 40 moves to step 206 where it determines whether or not the acquisition of the GPS information and the time information has been completed. In a case where the determination is yes, the CPU 40 moves to step 208. In a case where the determination is no, the CPU 40 moves to step 209. In step 209, the CPU 40 determines whether or not a variable x is less than a threshold value N. In a case where the determination is no, the CPU 40 moves to step 208. In a case where the determination is yes, the CPU 40 moves to step 212 where it increments the variable x by 1. Thereafter, the CPU 40 returns to step 206.

In step 208, the CPU 40 acquires the most recent single frame's worth of image information (e.g., YC signals) obtained by shooting and shooting support information that supports that shooting. Thereafter, the CPU 40 moves to step 210. In the present embodiment, the CPU 40 applies, as the shooting support information, shooting support information that is acquired prior to shooting—such as, for example, brightness (zone photometric values, which are photometric values of zones obtained by dividing (e.g., a 16×16 division) the screen into plural areas), distance information, focus position, focus evaluation value, face detection result—and supports that shooting.

Figure 12:
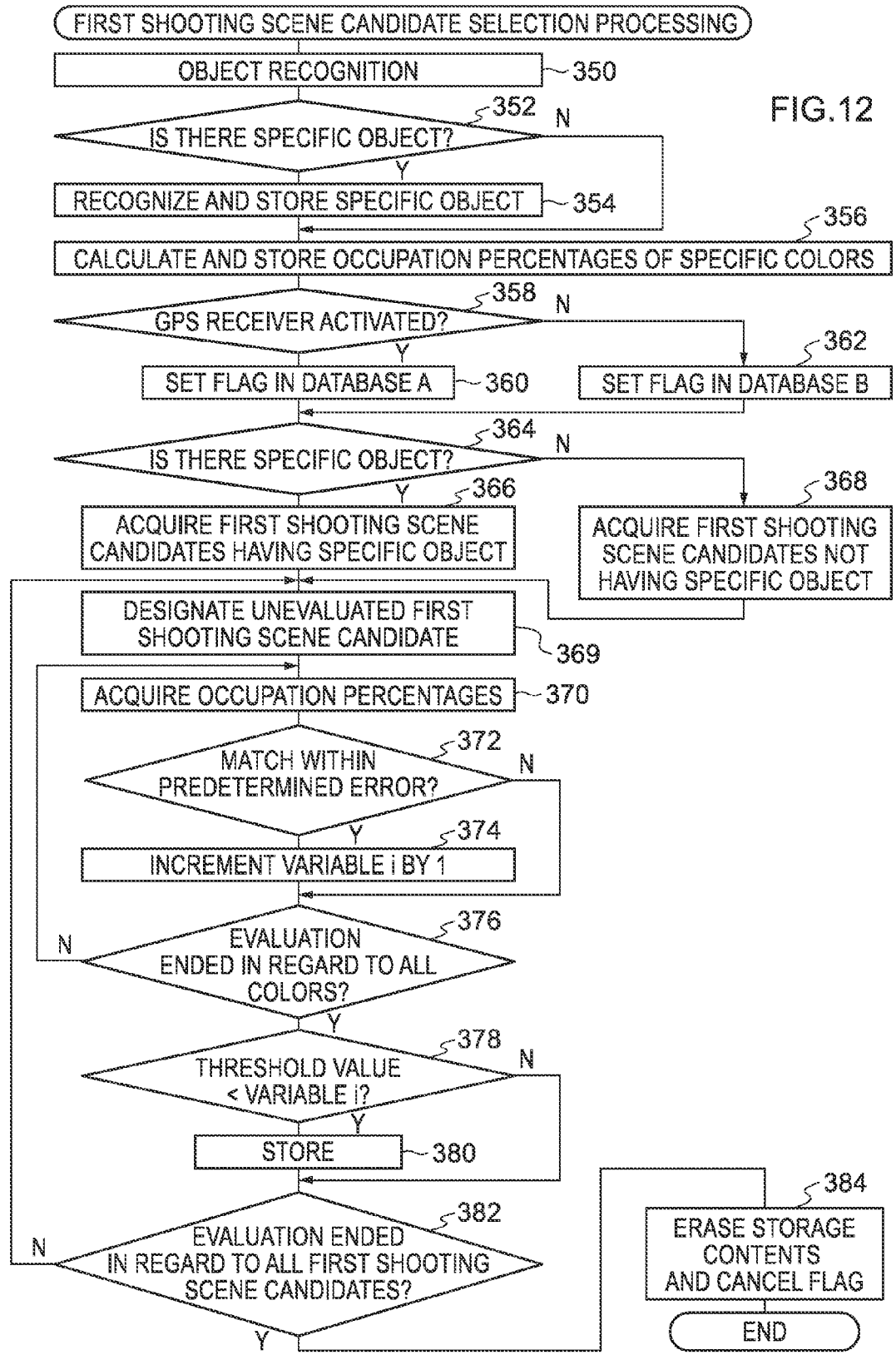
FIG. 12 is a flowchart showing an example of a flow of processing by a first shooting scene candidate selection processing program pertaining to the embodiment.

In step 210, the CPU 40 executes a first shooting scene candidate selection processing program. FIG. 12 is a flowchart showing an example of a flow of the first shooting scene candidate selection processing program. This program is stored beforehand in a predetermined program storage region of the memory 48.

In step 350 of FIG. 12, the CPU 40 recognizes, on the basis of the image information and the shooting support information acquired by the processing of step 208, a specific object included in the subject image represented by that image information. Thereafter, the CPU 40 moves to step 352. The object included in the subject image can be recognized, for example, by dividing the subject image into plural regions and using a predetermined template to perform pattern matching in each of the regions obtained by the division. In the present embodiment, the CPU 40 applies "outdoor lamp", "sun", "beach", "sandy area", "green area", "snow", "face of a person", and so forth as specific objects, but needless to say the specific object may also be an object other than these.

In step 352, the CPU 40 determines whether or not a specific object has been recognized by the processing of step 350. In a case where the determination is yes, the CPU 50 moves to step 354. In a case where the determination is no, the CPU 40 moves to step 356.

In step 354, the CPU 40 stores, in a storage region γ of the memory 48, an object information item for recognizing the specific object recognized by the processing of step 350. Thereafter, the CPU 40 moves to step 356.

In step 356, the CPU 40 calculates the occupation percentages (e.g., "number of pixels of specific color/number of pixels in entire image") of each of the plural specific colors in the entire image, taking the subject image provided to the processing of step 350 as a target, and stores the occupation percentages obtained by the calculation in a storage region δ of the memory 48. Thereafter, the CPU 40 moves to step 358.

In step 358, the CPU 40 determines whether or not the GPS receiver 58 is activated (here, as an example, whether or not GPS information and time information is stored in the storage region β of the memory 48). In a case where the determination is yes, the CPU 40 moves to step 360. In a case where the determination is no, the CPU 40 moves to step 362. In step 360, the CPU 40 sets a flag with respect to the database A. Thereafter, the CPU 40 moves to step 364. In step 362, the CPU 40 sets a flag with respect to the database B. Thereafter, the CPU 40 moves to step 364.

In step 364, the CPU 40 determines whether or not an object information item is stored in the storage region γ of the memory 48. In a case where the determination is yes, the CPU 40 moves to step 366. In a case where the determination is no, the CPU 40 moves to step 368. In step 366, the CPU 40 acquires the object information item from the storage region γ of the memory 48, erases the storage contents of the storage region γ, and acquires, from the database (the database A or the database B) in which the flag is set at the current point in time, all of the first shooting scene candidate information items correlated with object information items corresponding to the object information item acquired from the storage region γ. Thereafter, the CPU 40 moves to step 369.

In step 368, the CPU 40 acquires, from the database (the database A or the database B) in which the flag is set at the current point in time, all of the first shooting scene candidate information items with which object information items are not correlated (the first shooting scene candidate information items corresponding to "-" shown in FIG. 2). Thereafter, the CPU 40 moves to step 369. In a case where object information items are correlated with all of the first shooting scene candidates in the databases A and B, the processing of steps 364 and 368 is unnecessary.

In step 369, in relation to the first shooting scene candidate information items acquired by the processing of step 366 or step 368, the CPU 40 designates, as a first shooting scene candidate information item to pay attention to, one first shooting scene candidate information item that still has not been made a target of the processing of step 370 to step 376. Thereafter, the CPU 40 moves to step 370.

In step 370, the CPU 40 acquires the occupation percentage of a specific color from the storage region δ of the memory 48. Thereafter, the CPU 40 moves to step 372 where it determines whether or not the occupation percentage of the specific color acquired by the processing of step 370 coincides, within a predetermined error, with the occupation percentage of the same color correlated with the first shooting scene candidate information item designated by the processing of step 369, whereby the CPU 40 determines whether or not the occupation percentage of the specific color is equal to or greater than a predetermined degree of similarity. In a case where the determination is yes, the CPU 40 moves to step 374 where it increments a variable i by 1. Thereafter, the CPU 40 moves to step 376.

In a case where the determination is no in step 372, the CPU 40 moves to step 376. In step 376, the CPU 40 determines whether or not it has executed the processing of steps 370 to 374 in regard to the occupation percentages of all of the colors stored in the storage region δ of the memory 48. In a case where the determination is no, the CPU 40 moves to step 370. In a case where the determination is yes, the CPU 40 moves to step 378.

In step 378, the CPU 40 determines whether or not the variable i exceeds a threshold value (e.g., a value that becomes an index indicating the degree of similarity) predetermined as a value with which it can be determined that the image information and the shooting support information acquired by the processing of step 208 is similar to the image information and the shooting support information (e.g., the zone photometric values that were used in the shooting of the first shooting scene candidates in order to acquire the image information) included in the first shooting scene candidate information items representing the first shooting scene candidates. In a case where the determination is yes, the CPU 40 moves to step 380 where it intercorrelates, and stores in a storage region ε of the memory 48, the first shooting scene candidate information items acquired at the current point in time (the first shooting scene candidate information items acquired by the processing of step 366 or step 368) and the variable i. Thereafter, the CPU 40 moves to step 382.

In step 382, the CPU 40 determines whether or not there exists, in relation to the first shooting scene candidate information items acquired at the current point in time (the first shooting scene candidate information items acquired by the processing of step 366 or step 368), a first shooting scene candidate information item that still has not been made a target of the processing of step 370 to step 376. In a case where the determination is no, the CPU 40 returns to step 369. In a case where the determination is yes, the CPU 40 moves to step 384 where it erases the storage contents of the storage region δ and cancels the setting of the flag with respect to the database (the database A or the database B). Thereafter, the CPU 40 ends the first shooting scene candidate selection processing program and moves to step 214 of the flowchart shown in FIG. 11.

In step 214 of FIG. 11, the CPU 40 determines whether or not GPS information and time information is stored in the storage region β of the memory 48 and whether or not a position information item corresponding to the GPS information stored in the storage region β of the memory 48 and a time frame corresponding to the time information stored in the storage region β of the memory 48 are included in the database C. In a case where the determination is yes, the CPU 40 moves to step 216. In step 216, the CPU 40 acquires, from the database C shown in FIG. 3 as an example, all of the second shooting scene candidate information items with which the position information item corresponding to the GPS information (latitude, longitude, elevation) stored in the storage region β of the memory 48 is correlated and with which the time frame to which the time information stored in the storage region β of the memory 48 belongs is also correlated. Thereafter, the CPU 40 moves to step 218. In step 218, the CPU 40 determines whether or not the number of second shooting scene candidate information items acquired by the processing of step 216 is plural. In a case where the determination is yes, the CPU 40 moves to step 220. In a case where the determination is no, the CPU 40 moves to step 222.

In step 220, in relation to each of the plural second shooting scene candidate information items acquired by the processing of step 216, the CPU 40 stores, in a storage region ζ the memory 48, the second shooting scene candidate information item with which is correlated the greatest degree of reliability among the plural degrees of reliability uniquely identified from the database C by the GPS information and the time information stored in the storage region β of the memory 48. Thereafter, the CPU 40 moves to step 224. In step 222, the CPU 40 stores the second shooting scene candidate information item acquired by the processing of step 216 in the storage region ζ of the memory 48. Thereafter, the CPU 40 moves to step 224.

In step 224, the CPU 40 determines whether or not a first shooting scene candidate information item corresponding to the second shooting scene candidate information item stored in the storage region ζ the processing of step 220 or step 222 is stored in the storage region ε of the memory 48. In a case where the determination is yes, the CPU 40 moves to step 226.

In step 226, the CPU 40 stores the second shooting scene candidate information item stored in the storage region ζ the processing of step 220 or step 222 in a storage region η of the memory 48 as a shooting scene information item identifying the shooting scene recommended by the shooting scene recommendation function. Thereafter, the CPU 40 ends the scene recognition processing program.

In a case where the determination is no in step 214, the CPU 40 moves to step 228 where it acquires the first shooting scene candidate information items from the storage region ε of the memory 48. Thereafter, the CPU 40 moves to step 230 where it stores, in the storage region η of the memory 48 as a shooting scene information item identifying the shooting scene recommended by the shooting scene recommendation function, the item having the highest degree of reliability among the first shooting scene candidate information items acquired from the storage region ε of the memory 48. Thereafter, the CPU 40 ends the scene recognition processing program. In step 230, the "item having the highest degree of reliability" means, for example, the item in which the variable i correlated with the first shooting scene candidate information items is the largest.

In a case where the determination is no in step 224, the CPU 40 moves to step 232. In step 232, the CPU 40 stores, in the storage region η of the memory 48 as a shooting scene information item identifying the shooting scene recommended by the shooting scene recommendation function, the item having the highest degree of reliability among the first shooting scene candidate information items stored in the storage region ε of the memory 48 and the second shooting scene candidate information items stored in the storage region ζ of the memory 48. Thereafter, the CPU 40 ends the scene recognition processing program. In step 232, the "item having the highest degree of reliability" means, for example, the shooting scene candidate information item having the largest variable i obtained by comparing the variable i correlated with the first shooting scene candidate information items stored in the storage region ε of the memory 48 and a variable i obtained by using a predetermined table or computational expression to convert the degrees of reliability correlated with the second shooting scene candidate information items stored in the storage region ζ of the memory 48 into the variable i.

Figure 13:
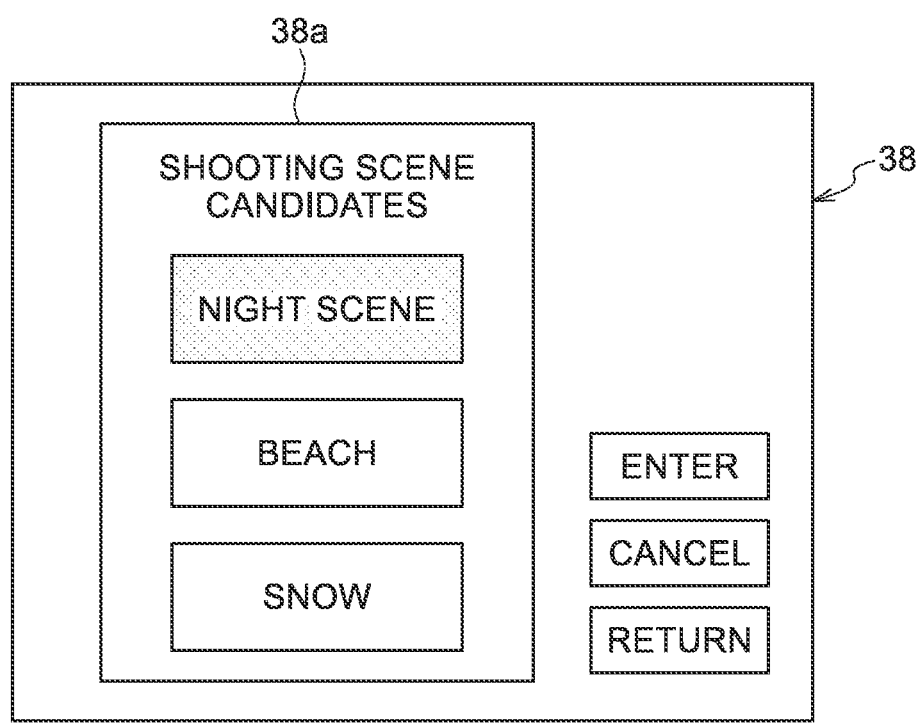
FIG. 13 is a schematic diagram showing an example display of shooting scene candidates pertaining to the embodiment.

FIG. 13 shows an example configuration of presenting to the user the shooting scene recommended by the shooting scene recommendation function. On the display surface of the LCD 38, a shooting scene candidate screen showing shooting scene candidates is displayed, and an enter button, a cancel button, and a screen return button are also displayed. On the shooting scene candidate screen 38a, shooting scene information items identifying plural shooting scenes are displayed in the form of designatable buttons. In the example shown in FIG. 13, a shooting scene information item identifying a "night scene" shooting scene, a shooting scene information item identifying a "beach" shooting scene, and a shooting scene information item identifying a "snow" shooting scene are displayed in the form of buttons, and the button indicating the shooting scene information item identifying the shooting scene recommended by the shooting scene recommendation function is displayed in a flashing manner. In the example shown in FIG. 13, the button pertaining to the shooting scene information item identifying the "night scene" shooting scene is displayed in a flashing manner. When any of the buttons displayed on the shooting scene candidate screen 38a is designated by the user via the touch panel, the designated button is highlighted, and when the enter button is subsequently designated, shooting becomes executable in the shooting condition predetermined as the shooting condition suited to the shooting scene identified by the shooting scene information item pertaining to the highlighted button.

As described in detail above, the digital camera 10 pertaining to the present embodiment is equipped with: an imaging system 12 serving as shooting means that shoots a subject to thereby acquire a subject image; the GPS receiver 58 serving as acquiring means which, in a case where it has been activated, utilizes GPS to acquire GPS information; the CPU 40 serving as activating means that activates the GPS receiver 58 in a case where a predetermined condition for activating the GPS receiver 58 has been met; the database C in which position information items representing geographical positions identifiable by the GPS information and second shooting scene candidate information items serving as shooting scene information items representing shooting scenes at the positions identified by the position information items are intercorrelated and stored; and the CPU 40 serving as scene recognizing means which, in a case where the GPS information acquired by the activated GPS receiver 58 corresponds to a position information item stored in the database C, identifies the shooting scene at the current shooting location on the basis of the second shooting scene candidate information items and at least one of the subject image acquired by the shooting and shooting support information that is acquired prior to shooting for acquiring the subject image and supports that shooting, and which, in at least one of a case where the GPS receiver 58 has not been activated, a case where the GPS information has not been received by the GPS receiver 58 even though the GPS receiver 58 has been activated, and a case where a position information item corresponding to the GPS information received by the activated GPS receiver 58 is not included in the database C, identifies the shooting scene at the current shooting location on the basis of at least one of the subject image acquired by the shooting and the shooting condition used in the shooting for acquiring the subject image. Thus, the digital camera 10 can recognize shooting scenes according to the situation with a high degree of precision.

Further, in the digital camera 10 pertaining to the present embodiment, in the case where the GPS information acquired by the activated GPS receiver 58 corresponds to a position information item stored in the database C, the CPU 40 selects, from plural first shooting scene candidates serving as predetermined plural shooting scene candidates, first shooting scene candidates to which at least one of the subject image acquired by the shooting and the shooting condition is similar with a degree of similarity equal to or greater than a predetermined degree of similarity, and among the selected first shooting scene candidates, the CPU 40 identifies, as the shooting scene at the current shooting location, the second shooting scene candidate corresponding to the second shooting scene candidate among the second shooting scene candidates stored in the database C that is correlated with the position information item corresponding to the GPS information received by the GPS receiver 58. Thus, the digital camera 10 can recognize shooting scenes according to the situation with an even higher degree of precision.

Further, in the digital camera 10 pertaining to the present embodiment, in the case where the GPS information acquired by the activated GPS receiver 58 corresponds to a position information item stored in the database C, the CPU 40 selects, from the database A, first shooting scene candidates to which at least one of the subject image acquired by the shooting and the shooting condition is similar with a degree of similarity equal to or greater than the predetermined degree of similarity, and among the selected first shooting scene candidates, the CPU 40 recognizes, as the shooting scene at the current shooting location, the first shooting scene candidate corresponding to the second shooting scene candidate among the shooting scene information items stored in the database C that is correlated with the position information item corresponding to the GPS information received by the GPS receiver 58, and in at least one of the case where the GPS receiver 58 has not been activated, the case where the GPS information has not been received by the GPS receiver 58 even though the GPS receiver 58 has been activated, and the case where a position information item corresponding to the GPS information received by the activated GPS receiver 58 is not included in the database C, the CPU 40 selects, from the database B, a specific first shooting scene candidate to which at least one of the subject image acquired by the shooting and the shooting condition is similar with a degree of similarity equal to or greater than the predetermined degree of similarity and recognizes the selected first shooting scene candidate as the shooting scene at the current shooting location. Thus, the digital camera 10 can recognize shooting scenes according to the situation with an even higher degree of precision.

Further, in the digital camera 10 pertaining to the present embodiment, the database C further correlates, with the second shooting scene candidates, and stores time information items (time frames) representing times of the second shooting scene candidates, the digital camera 10 is further equipped with the GPS receiver 58 serving as time acquiring means that acquires the current time, and in the case where the GPS information acquired by the activated GPS receiver 58 corresponds to a position information item stored in the database C, the CPU 40 selects, from the database A (or the database B), first shooting scene candidates to which at least one of the subject image acquired by the shooting and the shooting condition is similar with a degree of similarity equal to or greater than the predetermined degree of similarity, and among the selected first shooting scene candidates, the CPU 40 recognizes, as the shooting scene at the current shooting location, the first shooting scene candidate corresponding to the second shooting scene candidate among the second shooting scene candidates stored in the database C that is correlated with the position information item and the time frame corresponding to the GPS information and the time information received by the GPS receiver 58. Thus, the digital camera 10 can recognize shooting scenes according to the situation with an even higher degree of precision.

Further, in the digital camera 10 pertaining to the present embodiment, the database C further correlates, with the second shooting scene candidates, and stores degrees of reliability of the second shooting scene candidates, and in the case where the GPS information acquired by the activated GPS receiver 58 corresponds to a position information item stored in the database C, the CPU 40 selects, from the database A (or the database B), first shooting scene candidates to which at least one of the subject image acquired by the shooting and the shooting condition is similar with a degree of similarity equal to or greater than the predetermined degree of similarity, and among the selected first shooting scene candidates, the CPU 40 recognizes, as the shooting scene at the current shooting location, the first shooting scene candidate corresponding to the second shooting scene candidate among the second shooting scene candidates stored in the database C that is correlated with the position information item and the time frame corresponding to the GPS information and the time information received by the GPS receiver 58 and which has a degree of reliability equal to or greater than a predetermined degree of reliability. Thus, the digital camera 10 can recognize shooting scenes according to the situation with an even higher degree of precision.

Further, in the present embodiment, the digital camera 10 is equipped with the operation unit 56 that accepts an instruction to change the storage contents of the database C and the CPU 40 that changes the storage contents of the database C in accordance with the instruction accepted by the operation unit 56. Thus, user-friendliness can be improved.

Further, in the present embodiment, the digital camera 10 is further equipped with the CPU 40 that causes the GPS receiver 58 to acquire the GPS information in a predetermined cycle and changes the cycle in a case where a change condition predetermined as a condition for changing the predetermined cycle has been met. Thus, the amount of consumed power required for updating the GPS information can be suppressed while suppressing a drop in the degree of precision of the identification of the shooting scene.

Further, in the present embodiment, the digital camera 10 is further equipped with the CPU 40 serving as shooting scene detecting means that detects a change in the shooting scene at the shooting location on the basis of image information acquired by the shooting.

Further, in the present embodiment, the digital camera 10 applies, as the condition for changing the predetermined cycle, a condition where a change equal to or greater than a predetermined quantity in the shooting scene has been detected by the CPU 40. Thus, the amount of consumed power required for updating the GPS information can be suppressed while suppressing a drop in the degree of precision of the identification of the shooting scene.

Figure 14:
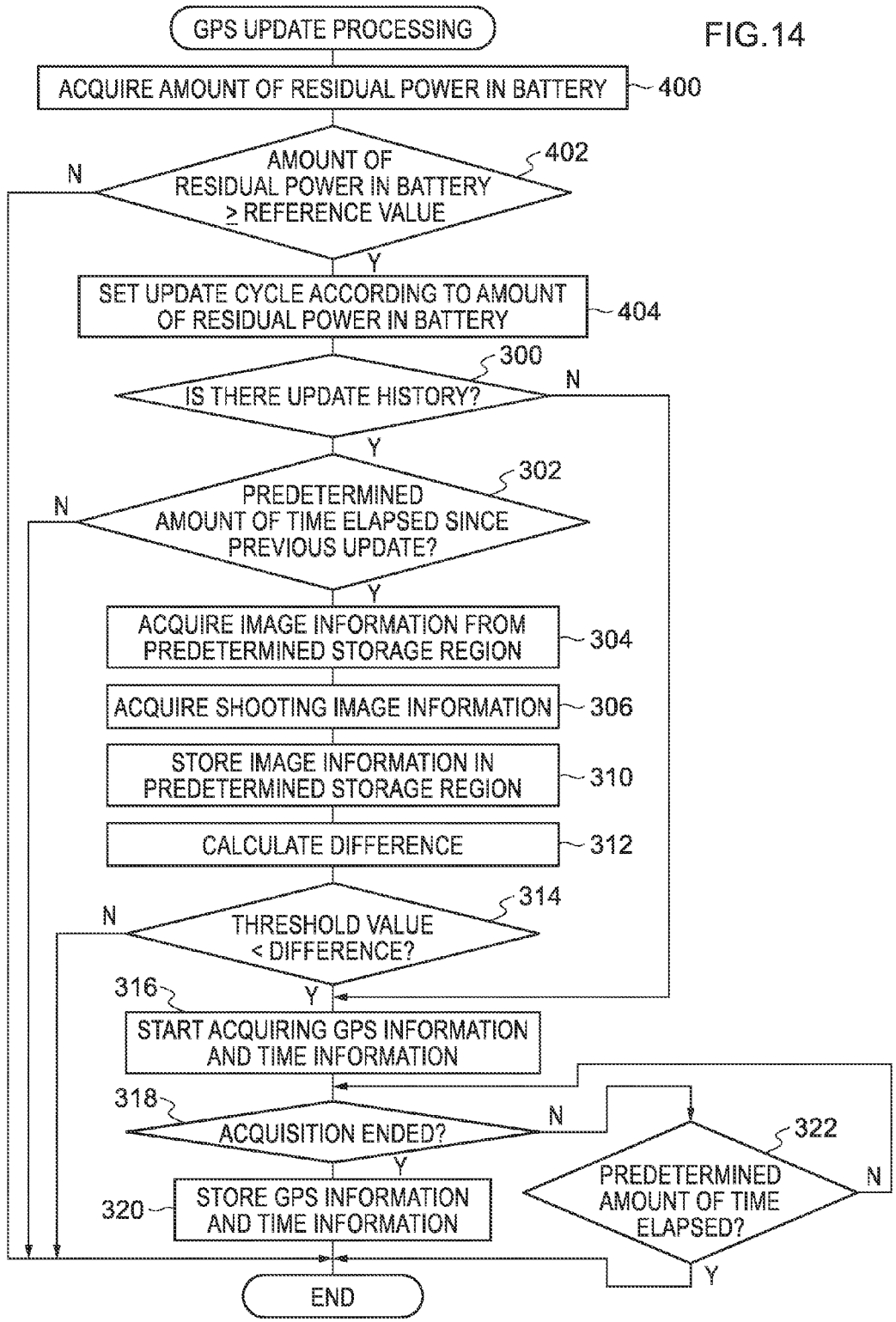
FIG. 14 is a flowchart showing an example of a flow of processing by the GPS update processing program (2) pertaining to the embodiment.

In the above embodiment, there was described an example configuration in a case where the CPU 40 executes the GPS update processing in a fixed cycle, but the CPU 40 may also change the cycle in which it executes the GPS update processing. For example, in a case where the amount of residual power in the battery of the digital camera 10 is equal to or greater than a reference value, the CPU 40 may enable the acquisition of the GPS information and the time information using GPS and change the update cycle in accordance with the amount of residual power in the battery. In this case, example configurations include a configuration where, as shown in FIG. 14 as an example, steps 400, 402, and 404 are added before step 300 of the GPS update processing program. In step 400, the CPU 40 acquires the amount of residual power in the battery. Thereafter, the CPU 40 moves to step 402 where it determines whether or not the amount of residual power in the battery acquired by the processing of step 400 is equal to or greater than the reference value. In a case where the determination is no, the CPU 40 ends the GPS update processing program. In a case where the determination is yes in step 402, the CPU 40 moves to step 404 where it sets an update cycle according to the amount of residual power in the battery. Thereafter, the CPU 40 moves to step 300. In step 404, for example, the CPU 40 may set a cycle that is uniquely determined with respect to the amount of residual power in the battery, so that the update cycle becomes longer as the amount of residual power in the battery becomes lower. Because of this, the power consumption required when acquiring the GPS information and the time information can be controlled.

Further, the CPU 40 may also change the update cycle only in a case where the amount of residual power in the battery of the digital camera 10 is equal to or greater than the reference value and a change equal to or greater than a predetermined quantity in the shooting scene at the shooting location has been detected. In this case, compared to the case where the CPU 40 simply changes the update cycle if the amount of residual power in the battery of the digital camera 10 is equal to or greater than the reference value, it becomes possible to further control the power consumption required when acquiring the GPS information and the time information because another condition is added as a condition for changing the update cycle. The CPU 40 may also change the update cycle only in a case where, regardless of the amount of residual power in the battery, a change equal to or greater than a predetermined quantity in the shooting scene at the shooting location has been detected.

Further, as another example configuration that is effective for controlling the power consumption required when acquiring the GPS information and the time information, the digital camera 10 may also be configured in such a way that, as shown in FIG. 15 for example, degrees of similarity between the second shooting scene candidate information items correlated with the GPS information and shooting scene information items identifying shooting scenes included in predetermined regions including the positions identified by the GPS information (e.g., regions within a 300-meter radius of the positions identified by the GPS information) are correlated with each of the GPS information items and stored in the database C, and in a case where the GPS information has been received by the GPS receiver 58, the CPU 40 sets a longer update cycle as the degree of similarity correlated with the received GPS information item becomes greater. Because of this, if the shooting scene at the shooting location is a place that is practically unchanged from the time of the previous shooting (e.g., in the middle of a large prairie or in the middle of a giant desert), there is practically no problem if the GPS information update cycle (GPS update cycle) is lengthened. In contrast, if the shooting scene at the shooting location is a place that changes at a dizzying pace (e.g., a street with a lot of pedestrian traffic in a city center), it becomes possible to recognize the shooting scene with a high degree of precision by shortening the GPS information update cycle.

Further, in the above embodiment, there was described an example configuration in a case where the CPU 40 selects the first shooting scene candidates (the second shooting scene candidates) to which the subject image is similar with a degree of similarity equal to or greater than a predetermined degree of similarity on the basis of specific objects and colors included in the subject image, but the CPU 40 may also select the first shooting scene candidates (the second shooting scene candidates) to which the shooting support information is similar with a degree of similarity equal to or greater than a predetermined degree of similarity. In this case, the CPU 40 may correlate shooting support information (e.g., zone photometric values) predetermined as the shooting support information with the first shooting scene candidate information items included in the database A and the database B and select, in the databases A and B, the first shooting scene candidate information items corresponding to the shooting support information corresponding to the shooting support information that was used in the actual shooting. Further, the CPU 40 may also apply, in joint use with the method of selecting the first shooting scene candidate information items on the basis of specific objects and colors included in the subject image, a method of selecting the first shooting scene candidate information items from the shooting support information provided to the shooting. In this case, in a case where the number of the first shooting scene candidate information items recognized from specific objects is plural, it becomes possible to use the shooting support information to narrow down the first shooting scene candidate information items from those, and shooting scenes according to the current situation can be recognized with an even higher degree of precision. "Narrow down the first shooting scene candidate information items" means, for example, selecting, among the plural first shooting scene candidate information items, first shooting scene candidate information items where the shooting support information included in the first shooting scene candidate information items is most similar to the shooting support information provided to the shooting.

Further, in the above embodiment, there was described an example configuration in a case where the digital camera 10 applies the time information received by the GPS receiver 58 as the time information, but the digital camera 10 is not limited to this and may also be configured in such a way that a real-time clock (RTC) is installed in the digital camera 10 and the digital camera 10 acquires the time information from the RTC. By installing an RTC in the digital camera 10 in this way, it becomes possible to use the time obtained from the RTC to select the second shooting scene candidates even if the digital camera 10 was for some reason unable to use GPS to acquire the time information.

Further, in the above embodiment, the digital camera 10 was configured to derive the second shooting scene candidate in the database C on the basis of the GPS information and the time information received by the GPS receiver 58, but the digital camera 10 is not limited to this and may also be configured to derive the second shooting scene candidate from the GPS information or the time information received by the GPS receiver 58. Further, the digital camera 10 may also use the database C shown in FIG. 3 as an example to derive the second shooting scene candidate that is correlated with the position information item corresponding to the GPS information received by the GPS receiver 58 and which has a degree of reliability equal to or greater than a predetermined degree of reliability and recognize the derived second shooting scene candidate as the shooting scene at the current shooting location.

Further, in the above embodiment, second shooting scene candidate information items and degrees of reliability were correlated with all of the position information items in the database C, so the CPU 40 was able to select a second shooting scene candidate information item and a degree of reliability directly from the position information item corresponding to the GPS information acquired using GPS, but second shooting scene candidate information items and degrees of reliability do not have to be correlated with all of the position information items included in the database C. In this case, the CPU 40 may derive a second shooting scene candidate and a degree of reliability using an interpolation method from the second shooting scene candidate information items and the degrees of reliability correlated with each of the plural position information items other than the position information item corresponding to the GPS information acquired using GPS. Further, in this case, by applying weighted values to the second shooting scene candidate information items and the degrees of reliability, it becomes possible to recognize shooting scenes with a high degree of precision.

Further, in the above embodiment, there was exemplified a software-based configuration where the steps of the scene recognition processing program were realized as a result of the scene recognition processing program being executed by the CPU 40, but the digital camera 10 is not limited to this. Examples of other configurations include a hardware-based configuration configured by interconnecting various types of circuits (as an example, application-specific integrated circuits (ASIC)) and a configuration that combines a software-based configuration and a hardware-based configuration.

Further, in each of the above embodiments, there was described an example configuration in a case where the scene recognition processing program is stored beforehand in the memory 48, but the present invention is not limited to this and may also apply an embodiment where these programs are provided in a state in which they are stored in a recording medium read by a computer, such as a CD-ROM, a DVD-ROM, or a USB memory, or an embodiment where these programs are electronically transmitted via wired or wireless communication means.

The disclosure of Japanese Patent Application No. 2011-122119 is incorporated in its entirety herein by reference.

All publications, patent applications, and technical standards described in the present specification are incorporated herein by reference to the same extent as if each publication, patent application, or technical standard was specifically and individually indicated to be incorporated by reference.

What is claimed is:

1. A shooting device comprising:
   shooting means that shoots a subject to thereby acquire a subject image;
   acquiring means which, in a case where it has been activated, utilizes GPS to acquire GPS information identifying the position of the shooting location;
   activating means that activates the acquiring means in a case where a predetermined condition has been met;
   storing means in which position information items representing geographical positions identifiable by the GPS information and shooting scene information items representing shooting scenes at the positions represented by the position information items are intercorrelated and stored beforehand; and
   scene recognizing means which, in a case where the GPS information acquired by the acquiring means activated by the activating means corresponds to a position information item stored in the storing means, recognizes the shooting scene at the current shooting location on the basis of the shooting scene information item correlated with that position information item and at least one of the subject image acquired by the shooting means and shooting support information that is acquired prior to shooting for acquiring the subject image and supports that shooting,
   wherein in the case where the GPS information acquired by the acquiring means activated by the activating means corresponds to a position information item stored in the storing means, the scene recognizing means selects, from plural shooting scene candidate information items representing predetermined plural shooting scene candidates, shooting scene candidate information items to which at least one of the subject image acquired by the shooting means and the shooting support information is similar with a degree of similarity equal to or greater than a predetermined degree of similarity, and among the selected shooting scene candidate information items, the scene recognizing means recognizes, as the shooting scene at the current shooting location, the shooting scene candidate represented by the shooting scene candidate information item corresponding to the shooting scene information item among the shooting scene information items stored in the storing means that is correlated with the position information item corresponding to the GPS information acquired by the acquiring means.

2. The shooting device according to claim 1, wherein in at least one of a case where the activating means has not been activated, a case where the GPS information has not been acquired by the acquiring means even though the acquiring means has been activated by the activating means, and a case where a position information item corresponding to the GPS information acquired by the acquiring means activated by the activating means is not stored in the storing means, the scene recognizing means recognizes the shooting scene at the current shooting location on the basis of at least one of the subject image acquired by the shooting means and the shooting support information.

3. The shooting device according to claim 2, wherein
   the storing means stores a shooting scene information item group having a plurality of the shooting scene information items, and
   in the case where the GPS information acquired by the acquiring means activated by the activating means corresponds to a position information item in the storing means, the scene recognizing means uses the plural shooting scene candidate information items as information items corresponding to the plural shooting scene information items that the shooting scene information item group has, the scene recognizing means selects, from the plural shooting scene candidate information items, shooting scene information items to which at least one of the subject image acquired by the shooting means and the shooting support information is similar with a degree of similarity equal to or greater than the predetermined degree of similarity, and among the selected shooting scene candidate information items, the scene recognizing means recognizes, as the shooting scene at the current shooting location, the shooting scene candidate represented by the shooting scene candidate information item corresponding to the shooting scene information item among the shooting scene information items stored in the storing means that is correlated with the position information item corresponding to the GPS information acquired by the acquiring means, and
   in the at least one case, the scene recognizing means reduces the number of the shooting scene candidate information items to be less than the number of the plural shooting scene information items that the shooting scene information item group has and uses the shooting scene candidate information items as information items corresponding to the shooting scene information items, and among the shooting scene candidate information items, the scene recognizing means recognizes, as the shooting scene at the current shooting location, the shooting scene candidate represented by the shooting scene candidate information item to which at least one of the subject image acquired by the shooting means and the shooting support information is similar with a degree of similarity equal to or greater than the predetermined degree of similarity.

4. The shooting device according to claim 3, wherein the storing means further correlates, with the shooting scene information items, and stores time information items representing times of the shooting scenes represented by the shooting scene information items, the shooting device further comprises time acquiring means that acquires the current time, and in the case where the GPS information acquired by the acquiring means activated by the activating means corresponds to a position information item stored in the storing means, the scene recognizing means selects, from the plural shooting scene candidate information items, shooting scene candidate information items to which at least one of the subject image acquired by the shooting means and the shooting support information is similar with a degree of similarity equal to or greater than the predetermined degree of similarity, and among the selected shooting scene candidate information items, the scene recognizing means recognizes, as the shooting scene at the current shooting location, the shooting scene candidate represented by the shooting scene candidate information item corresponding to the shooting scene information item among the shooting scene information items stored in the storing means that is correlated with the position information item corresponding to the GPS information acquired by the acquiring means and the time information item corresponding to the current time acquired by the time acquiring means.

5. The shooting device according to claim 3, wherein the storing means further correlates, with the shooting scene information items, and stores degrees of reliability of the shooting scenes represented by the shooting scene information items, and in the case where the GPS information acquired by the acquiring means activated by the activating means corresponds to a position information item stored in the storing means, the scene recognizing means selects, from the plural shooting scene candidate information items, shooting scene candidate information items to which at least one of the subject image acquired by the shooting means and the shooting support information is similar with a degree of similarity equal to or greater than the predetermined degree of similarity, and among the selected shooting scene candidate information items, the scene recognizing means recognizes, as the shooting scene at the current shooting location, the shooting scene candidate represented by the shooting scene candidate information item corresponding to the shooting scene information item among the shooting scene information items stored in the storing means that is correlated with the position information item corresponding to the GPS information acquired by the acquiring means and which has a degree of reliability equal to or greater than a predetermined degree of reliability.

6. The shooting device according to claim 2, wherein the storing means further correlates, with the shooting scene information items, and stores time information items representing times of the shooting scenes represented by the shooting scene information items, the shooting device further comprises time acquiring means that acquires the current time, and in the case where the GPS information acquired by the acquiring means activated by the activating means corresponds to a position information item stored in the storing means, the scene recognizing means selects, from the plural shooting scene candidate information items, shooting scene candidate information items to which at least one of the subject image acquired by the shooting means and the shooting support information is similar with a degree of similarity equal to or greater than the predetermined degree of similarity, and among the selected shooting scene candidate information items, the scene recognizing means recognizes, as the shooting scene at the current shooting location, the shooting scene candidate represented by the shooting scene candidate information item corresponding to the shooting scene information item among the shooting scene information items stored in the storing means that is correlated with the position information item corresponding to the GPS information acquired by the acquiring means and the time information item corresponding to the current time acquired by the time acquiring means.

7. The shooting device according to claim 2, wherein the storing means further correlates, with the shooting scene information items, and stores degrees of reliability of the shooting scenes represented by the shooting scene information items, and in the case where the GPS information acquired by the acquiring means activated by the activating means corresponds to a position information item stored in the storing means, the scene recognizing means selects, from the plural shooting scene candidate information items, shooting scene candidate information items to which at least one of the subject image acquired by the shooting means and the shooting support information is similar with a degree of similarity equal to or greater than the predetermined degree of similarity, and among the selected shooting scene candidate information items, the scene recognizing means recognizes, as the shooting scene at the current shooting location, the shooting scene candidate represented by the shooting scene candidate information item corresponding to the shooting scene information item among the shooting scene information items stored in the storing means that is correlated with the position information item corresponding to the GPS information acquired by the acquiring means and which has a degree of reliability equal to or greater than a predetermined degree of reliability.

8. The shooting device according to claim 1, wherein the storing means further correlates, with the shooting scene information items, and stores time information items representing times of the shooting scenes represented by the shooting scene information items, the shooting device further comprises time acquiring means that acquires the current time, and in the case where the GPS information acquired by the acquiring means activated by the activating means corresponds to a position information item stored in the storing means, the scene recognizing means selects, from the plural shooting scene candidate information items, shooting scene candidate information items to which at least one of the subject image acquired by the shooting means and the shooting support information is similar with a degree of similarity equal to or greater than the predetermined degree of similarity, and among the selected shooting scene candidate information items, the scene recognizing means recognizes, as the shooting scene at the current shooting location, the shooting scene candidate represented by the shooting scene candidate information item corresponding to the shooting scene information item among the shooting scene information items stored in the storing means that is correlated with the position information item corresponding to the GPS information acquired by the acquiring means and the time information item corresponding to the current time acquired by the time acquiring means.

9. The shooting device according to claim 8, wherein
the storing means further correlates, with the shooting scene information items, and stores degrees of reliability of the shooting scenes represented by the shooting scene information items, and
in the case where the GPS information acquired by the acquiring means activated by the activating means corresponds to a position information item stored in the storing means, the scene recognizing means selects, from the plural shooting scene candidate information items, shooting scene candidate information items to which at least one of the subject image acquired by the shooting means and the shooting support information is similar with a degree of similarity equal to or greater than the predetermined degree of similarity, and among the selected shooting scene candidate information items, the scene recognizing means recognizes, as the shooting scene at the current shooting location, the shooting scene candidate represented by the shooting scene candidate information item corresponding to the shooting scene information item among the shooting scene information items stored in the storing means that is correlated with the position information item corresponding to the GPS information acquired by the acquiring means and the time information item corresponding to the current time acquired by the time acquiring means and which has a degree of reliability equal to or greater than a predetermined degree of reliability.

10. The shooting device according to claim 9, wherein the degrees of reliability are expressed as binary values.

11. The shooting device according to claim 1, wherein
the storing means further correlates, with the shooting scene information items, and stores degrees of reliability of the shooting scenes represented by the shooting scene information items, and
in the case where the GPS information acquired by the acquiring means activated by the activating means corresponds to a position information item stored in the storing means, the scene recognizing means selects, from the plural shooting scene candidate information items, shooting scene candidate information items to which at least one of the subject image acquired by the shooting means and the shooting support information is similar with a degree of similarity equal to or greater than the predetermined degree of similarity, and among the selected shooting scene candidate information items, the scene recognizing means recognizes, as the shooting scene at the current shooting location, the shooting scene candidate represented by the shooting scene candidate information item corresponding to the shooting scene information item among the shooting scene information items stored in the storing means that is correlated with the position information item corresponding to the GPS information acquired by the acquiring means and which has a degree of reliability equal to or greater than a predetermined degree of reliability.

12. The shooting device according to claim 1, further comprising
accepting means that accepts an instruction to change the storage contents of the storing means and
changing means that changes the storage contents of the storing means in accordance with the instruction accepted by the accepting means.

13. The shooting device according to claim 1, wherein
the acquiring means is configured to be capable of acquiring the GPS information in a predetermined cycle after the acquiring means has been activated by the activating means, and
the shooting device further comprises cycle changing means that changes the cycle in a case where a change condition predetermined as a condition for changing the cycle has been met.

14. The shooting device according to claim 13, further comprising shooting scene detecting means that detects a change in the shooting scene at the shooting location on the basis of image information acquired by the shooting means, wherein the change condition is a condition where a change in the shooting scene has been detected by the shooting scene detecting means.

15. The shooting device according to claim 14, further comprising power detecting means that detects the amount of residual power in a power source for driving the shooting device, wherein the change condition is a condition where an amount of residual power equal to or greater than a reference value has been detected by the power detecting means and a change in the shooting scene has been detected by the shooting scene detecting means.

16. The shooting device according to claim 13, further comprising power detecting means that detects the amount of residual power in a power source for driving the shooting device, wherein the change condition is a condition where an amount of residual power equal to or greater than a reference value has been detected by the power detecting means.

17. The shooting device according to claim 1, wherein
the storing means further correlates, with each of the position information items, and stores degrees of similarity between the shooting scenes represented by the shooting scene information items correlated with the position information items and shooting scenes included in predetermined regions including the positions represented by the position information items,
the acquiring means is configured to be capable of acquiring the position information items in a predetermined cycle after the acquiring means has been activated by the activating means, and
the shooting device further comprises cycle changing means that lengthens the cycle as the degree of similarity correlated with the position information item corresponding to the GPS information acquired by the acquiring means becomes greater.

18. The shooting device according to claim 1, further comprising power detecting means that detects the amount of residual power in a power source for driving the shooting device, wherein the acquiring means acquires, in the case where it has been activated, the GPS information when an amount of residual power equal to or greater than a reference value has been detected by the power detecting means.

19. The shooting device according to claim 1, wherein the degree of precision of the position information items is lower than the degree of precision required in the case of recognizing addresses on a map.

20. A non-transitory computer readable medium storing a program for causing a computer to function as:
an activating means which, in a case where a predetermined condition has been met, activates an acquiring means which, in a case where it has been activated, utilizes GPS to acquire GPS information identifying the position of a shooting location; and
a scene recognizing means which, in a case where the GPS information acquired by the acquiring means activated by the activating means corresponds to a position information item stored in a storing means in which position information items representing geographical positions identifiable by the GPS information and shooting scene information items representing shooting scenes at the positions represented by the position information items are intercorrelated and stored beforehand, recognizes the shooting scene at the current shooting location on the basis of the shooting scene information item correlated with that position information item and at least one of a subject image acquired by a shooting means that shoots a subject to thereby acquire a subject image and shooting support information that is acquired prior to shooting for acquiring the subject image and supports that shooting,
wherein in the case where the GPS information acquired by the acquiring means activated by the activating means corresponds to a position information item stored in the storing means, the scene recognizing means selects, from plural shooting scene candidate information items representing predetermined plural shooting scene candidates, shooting scene candidate information items to which at least one of the subject image acquired by the shooting means and the shooting support information is similar with a degree of similarity equal to or greater than a predetermined degree of similarity, and among the selected shooting scene candidate information items, the scene recognizing means recognizes, as the shooting scene at the current shooting location, the shooting scene candidate represented by the shooting scene candidate information item corresponding to the shooting scene information item among the shooting scene information items stored in the storing means that is correlated with the position information item corresponding to the GPS information acquired by the acquiring means.

* * * * *